United States Patent
Imai

(10) Patent No.: US 8,547,866 B2
(45) Date of Patent: Oct. 1, 2013

(54) ROUTE CALCULATING SYSTEM

(75) Inventor: Satoshi Imai, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 239 days.

(21) Appl. No.: 13/017,692

(22) Filed: Jan. 31, 2011

(65) Prior Publication Data

US 2011/0205919 A1 Aug. 25, 2011

(30) Foreign Application Priority Data

Feb. 24, 2010 (JP) ................................. 2010-038654
Oct. 25, 2010 (JP) ................................. 2010-238246

(51) Int. Cl.
*G01R 31/08* (2006.01)

(52) U.S. Cl.
USPC ........................................................ 370/252

(58) Field of Classification Search
USPC ......... 370/203, 204–215, 229–240, 310–337, 370/338–350, 351–394, 395.1, 395.3, 395.4, 370/395.41, 395.42, 395.5, 395.52, 395.53, 370/412–421, 431–457, 458–463, 464–497, 370/498–522, 523–520, 521–529
See application file for complete search history.

(56) References Cited

U.S. PATENT DOCUMENTS

| 6,137,840 | A | * | 10/2000 | Tiedemann et al. | 375/297 |
| 7,339,897 | B2 | | 3/2008 | Larsson et al. | |
| 8,259,586 | B2 | * | 9/2012 | Watsen et al. | 370/238 |
| 8,295,173 | B2 | * | 10/2012 | Larsson et al. | 370/231 |
| 2003/0064744 | A1 | * | 4/2003 | Zhang et al. | 455/522 |
| 2003/0161268 | A1 | * | 8/2003 | Larsson et al. | 370/229 |
| 2005/0249121 | A1 | | 11/2005 | Matsunaga | |
| 2009/0052327 | A1 | * | 2/2009 | Larsson et al. | 370/238 |
| 2009/0168653 | A1 | * | 7/2009 | St. Pierre et al. | 370/238 |
| 2010/0118881 | A1 | * | 5/2010 | Palmer et al. | 370/401 |
| 2011/0205919 | A1 | * | 8/2011 | Imai | 370/252 |

FOREIGN PATENT DOCUMENTS

| JP | 2003-338832 | 11/2003 |
| JP | 2005-518717 | 6/2005 |
| JP | 2008-311830 | 12/2008 |

* cited by examiner

*Primary Examiner* — Jung-Jen Liu
(74) *Attorney, Agent, or Firm* — Myers Wolin, LLC

(57) ABSTRACT

A route calculation system includes a collection unit that collects a current link traffic volume and a link power consumption for each link included in a network; a link cost calculation unit that estimates, for each link, an increase in the link power consumption due to the request flow based on the current link traffic volume, the link power consumption, the request flow, and the characteristic, and calculates a link cost value based on the increase in the link power consumption; and a route determination unit that determines, as a route for the request flow, a route that has the smallest sum of the link cost values of each route connecting between any nodes, thereby reducing the power consumption in the entire network for a request flow.

12 Claims, 43 Drawing Sheets

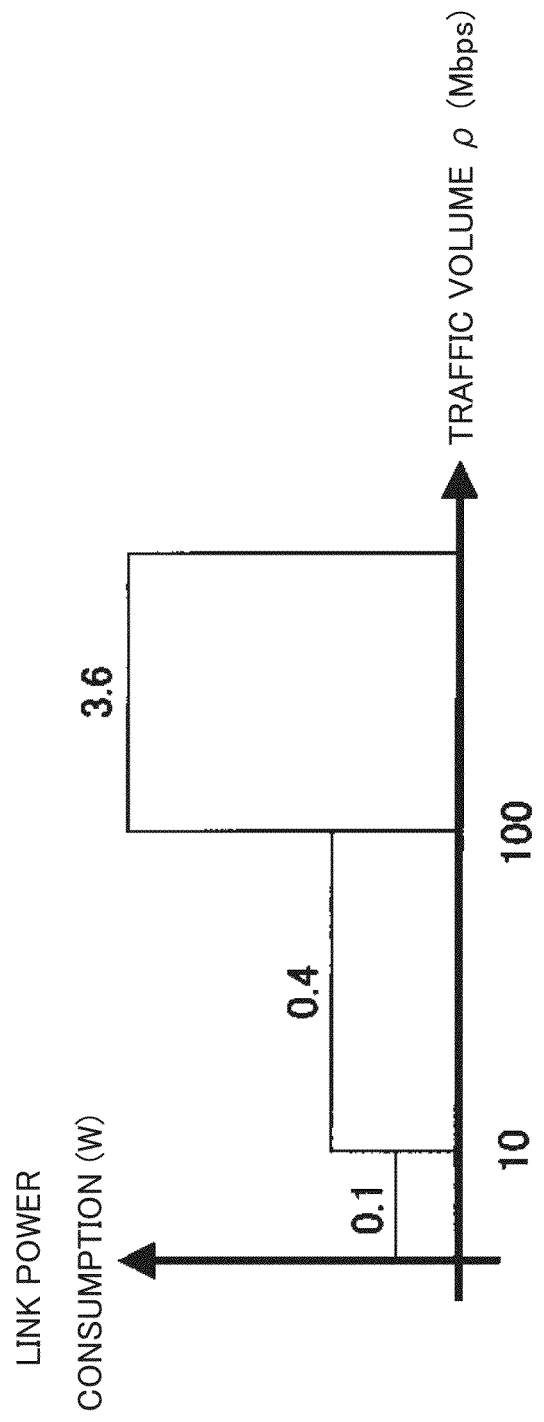

FIG. 7

| LINK ATTRIBUTE | LINK L1 | LINK L2 | LINK L3 | | LINK L7 | LINK L8 |
|---|---|---|---|---|---|---|
| ENDPOINT NODE | C1 | A1 | D1 | | B1 | D1 |
| LINK TRAFFIC VOLUME (Mbps) | 110 | 80 | 50 | | 95 | 60 |
| LINK POWER CONSUMPTION (W) | 3.6 | 0.4 | 0.4 | ...... | 0.4 | 0.4 |
| LINK TRAFFIC VOLUME (Mbps) : WHEN NEW FLOW ADDED | 120 | 90 | 60 | | 105 | 70 |
| LINK POWER CONSUMPTION (W) : WHEN NEW FLOW ADDED | 3.6 | 0.4 | 0.4 | | 3.6 | 0.4 |
| LINK POWER CHARACTERISTIC | FIG. 6 | FIG. 6 | FIG. 6 | | FIG. 6 | FIG. 6 |
| LINK COST | $\delta 1$ (MINUTE) | $\delta 1$ | $\delta 1$ | | 3.2 | $\delta 1$ |

FIG. 13

| LINK ATTRIBUTE | LINK L1 | LINK L2 | LINK L3 | LINK L4 | |
|---|---|---|---|---|---|
| ENDPOINT NODE | X1 | A1 | B1 | X1 | |
| TOTAL TRAFFIC VOLUME (Mbps) AT ENDPOINT NODE | 980 | 800 | 860 | 980 | |
| POWER CONSUMPTION (W) AT ENDPOINT NODE (Mbps) | 1 | 1 | 1 | 1 | ...... |
| TOTAL TRAFFIC VOLUME (Mbps) AT ENDPOINT NODE: WHEN NEW FLOW ADDED | 1000 | 820 | 880 | 1000 | |
| POWER CONSUMPTION (W) AT ENDPOINT NODE(Mbps): WHEN NEW FLOW ADDED | 5 | 1 | 1 | 5 | |
| LINK POWER CONSUMPTION CHARACTERISTIC | FIG. 12 | FIG. 12 | FIG. 12 | FIG. 12 | |
| LINK COST | 4 | $\delta 2$ | $\delta 2$ | 4 | |

FIG. 18

| LINK ATTRIBUTE | LINK L1 | LINK L2 | LINK L3 | LINK L4 | |
|---|---|---|---|---|---|
| ENDPOINT NODE | X1 | A1 | B1 | X1 | |
| LINK TRAFFIC VOLUME (Mbps) | 500 | 300 | 480 | 50 | |
| LINK POWER CONSUMPTION (W) | 3.6 | 3.6 | 3.6 | 0.4 | |
| LINK TRAFFIC VOLUME (Mbps) :WHEN NEW FLOW ADDED | 550 | 350 | 530 | 100 | |
| LINK POWER CONSUMPTION (W) :WHEN NEW FLOW ADDED | 3.6 | 3.6 | 3.6 | 3.6 | |
| TOTAL TRAFFIC VOLUME (Mbps) AT ENDPOINT NODE | 980 | 800 | 860 | 980 | |
| POWER CONSUMPTION (W) AT ENDPOINT NODE | 1000 | 1000 | 1000 | 1000 | |
| TOTAL TRAFFIC VOLUME (Mbps) AT ENDPOINT NODE :WHEN NEW FLOW ADDED | 1030 | 850 | 910 | 1030 | |
| POWER CONSUMPTION (W) AT ENDPOINT NODE :WHEN NEW FLOW ADDED | 5000 | 1000 | 1000 | 5000 | |
| LINK AND NODE POWER CONSUMPTION CHARACTERISTICS | FIGS. 16 AND 17 | FIGS. 16 AND 17 | FIGS. 16 AND 17 | FIGS. 16 AND 17 | |
| LINK COST | $\delta 1 + 4000$ | $\delta 1 + \delta 2$ | $\delta 1 + \delta 2$ | $3.2 + 4000$ | |

FIG. 23

| LINK ATTRIBUTE | LINK L1 | LINK L2 | LINK L3 | LINK L4 | LINK L5 | LINK L6 | LINK L7 | LINK L8 |
|---|---|---|---|---|---|---|---|---|
| ORIGIN NODE | A1 | C1 | C1 | B1 | A1 | D1 | D1 | B1 |
| ENDPOINT NODE | C1 | A1 | B1 | C1 | D1 | A1 | B1 | D1 |
| ORIGIN NODE POWER CHARACTERISTIC | CHARACT -ERISTIC 1 | CHARACT -ERISTIC 1 | CHARACT -ERISTIC 1 | CHARACT -ERISTIC 1 | CHARACT -ERISTIC 1 | CHARACT -ERISTIC 1 | CHARACT -ERISTIC 1 | CHARACT -ERISTIC 1 |
| ENDPOINT NODE POWER CHARACTERISTIC | CHARACT -ERISTIC 1 | CHARACT -ERISTIC 1 | CHARACT -ERISTIC 1 | CHARACT -ERISTIC 1 | CHARACT -ERISTIC 1 | CHARACT -ERISTIC 1 | CHARACT -ERISTIC 1 | CHARACT -ERISTIC 1 |
| LINK TRAFFIC VOLUME (Mbps) | 25 | 20 | 95 | 30 | 75 | 15 | 85 | 45 |
| LINK TRAFFIC VOLUME (WHEN NEW FLOW ADDED) | 35(>20) | (25<)30 | 105(>30) | (95>)40 | 85(>15) | (75>)25 | 95(>)45) | (85>)55 |
| POWER DETERMINING LINK (WHEN NEW FLOW ADDED) | LINK L1 | LINK L2 | LINK L3 | LINK L3 | LINK L5 | LINK L5 | LINK L7 | LINK L7 |
| LINK POWER CONSUMPTION (W) | 0.2+0.2 | 0.2+0.2 | 0.2+0.2 | 0.2+0.2 | 0.2+0.2 | 0.2+0.2 | 0.2+0.2 | 0.2+0.2 |
| LINK POWER CONSUMPTION (W) (WHEN NEW FLOW ADDED) | 0.2+0.2 | 0.2+0.2 | 1.8+1.8 | 0.2+0.2 | 0.2+0.2 | 0.2+0.2 | 0.2+0.2 | 0.2+0.2 |
| LINK COST | δ (MINUTE) | δ | 3.2 | δ | δ | δ | δ | δ |

FIG. 27

| LINK ATTRIBUTE | LINK L1 | LINK L2 | LINK L3 | LINK L4 | LINK L5 | LINK L6 | LINK L7 | LINK L8 |
|---|---|---|---|---|---|---|---|---|
| ORIGIN NODE | A1 | C1 | C1 | B1 | A1 | D1 | D1 | B1 |
| ENDPOINT NODE | C1 | A1 | B1 | C1 | D1 | A1 | B1 | D1 |
| ORIGIN NODE POWER CHARACTERISTIC | CHARACT-ERISTIC 2 | CHARACT-ERISTIC 1 | CHARACT-ERISTIC 1 | CHARACT-ERISTIC 2 | CHARACT-ERISTIC 2 | CHARACT-ERISTIC 1 | CHARACT-ERISTIC 1 | CHARACT-ERISTIC 2 |
| ENDPOINT NODE POWER CHARACTERISTIC | CHARACT-ERISTIC 1 | CHARACT-ERISTIC 2 | CHARACT-ERISTIC 2 | CHARACT-ERISTIC 1 | CHARACT-ERISTIC 1 | CHARACT-ERISTIC 2 | CHARACT-ERISTIC 2 | CHARACT-ERISTIC 1 |
| LINK TRAFFIC VOLUME (Mbps) | 25 | 20 | 95 | 30 | 75 | 15 | 85 | 45 |
| LINK TRAFFIC VOLUME (WHEN NEW FLOW ADDED) | 35(>20) | (25<)30 | 105(>30) | (95>)40 | 85(>15) | (75>)25 | 95(>45) | (85>)55 |
| POWER DETERMINING LINK (WHEN NEW FLOW ADDED) | LINK L1 | LINK L2 | LINK L3 | LINK L3 | LINK L5 | LINK L5 | LINK L7 | LINK L7 |
| LINK POWER CONSUMPTION (W) | 2.0+0.2 | 2.0+0.2 | | 0.2+2.0 | | 2.0+0.2 | | 0.2+2.0 |
| LINK POWER CONSUMPTION (W) (WHEN NEW FLOW ADDED) | 2.0+0.2 | 0.2+2.0 | 1.8+5.5 | 0.2+2.0 | 0.2+2.0 | 2.0+0.2 | 2.0+0.2 | 0.2+2.0 |
| LINK COST | δ (MINUTE) | δ | 5.1 | δ | δ | δ | δ | δ |

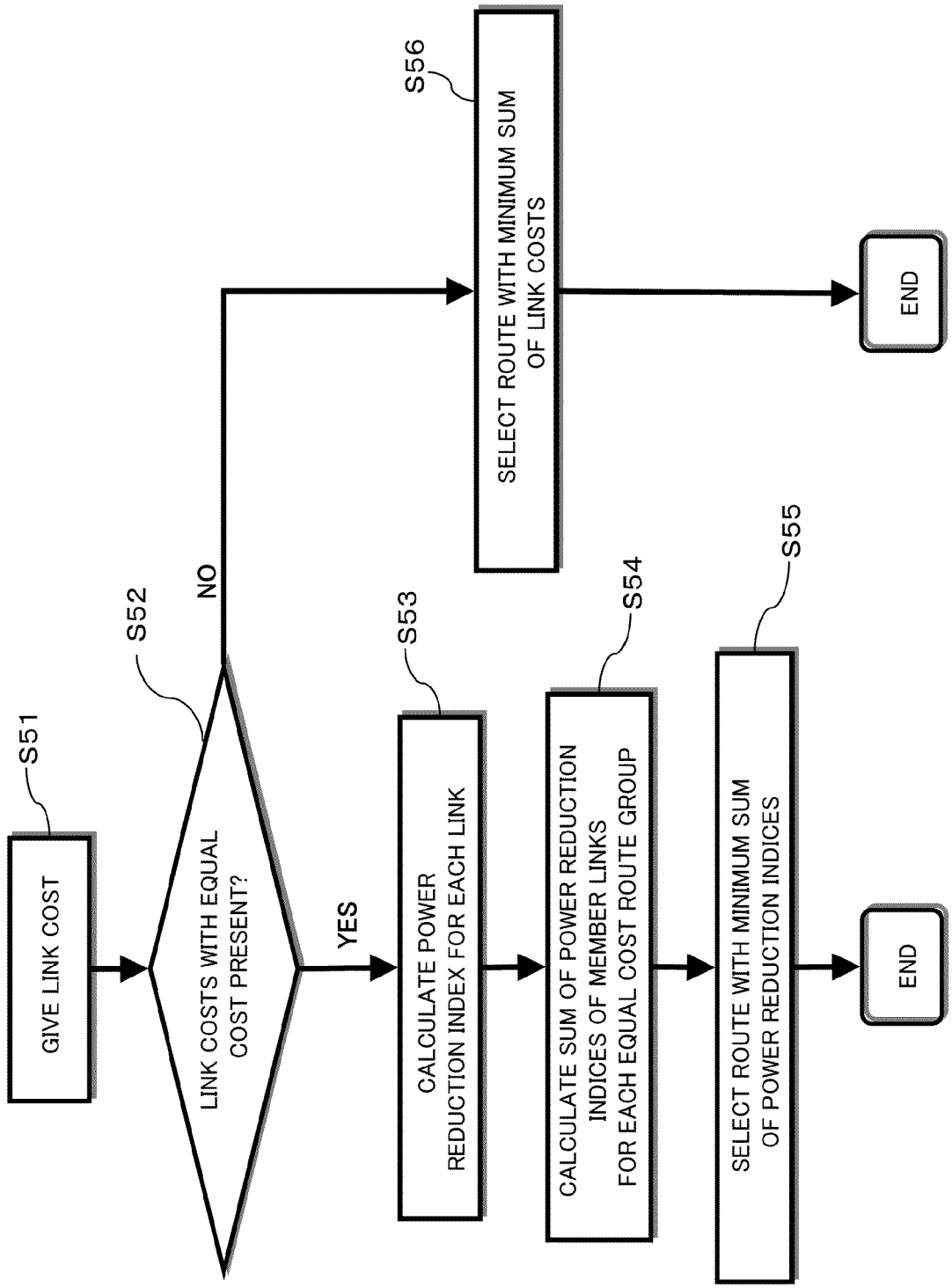

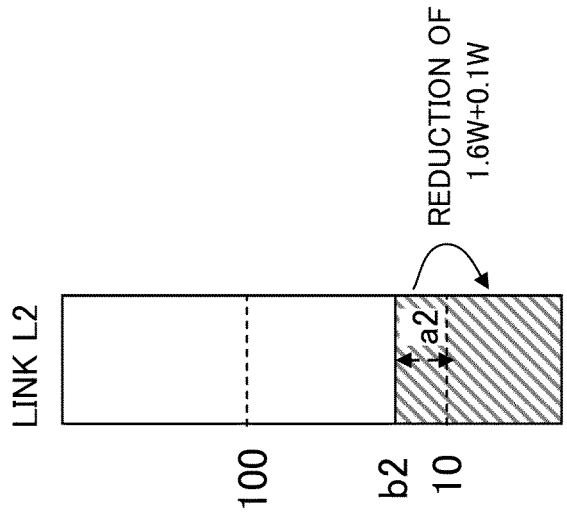
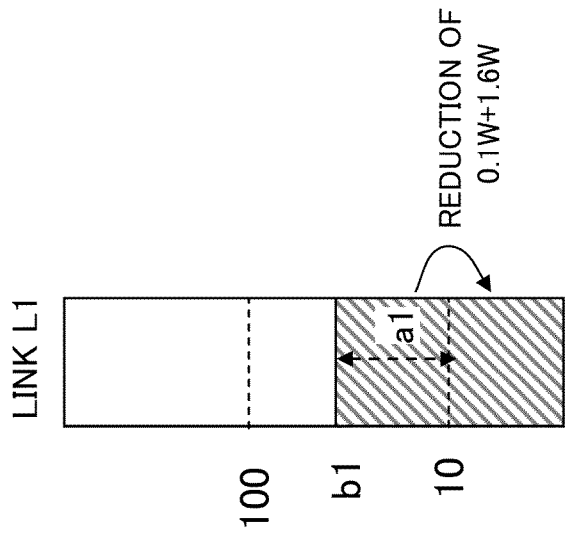

ROUTE CALCULATING SYSTEM

CROSS-REFERENCE TO RELATED APPLICATIONS

This application is based upon and claims the benefit of priority of the prior Japanese Patent Applications No. 2010-038654, filed on Feb. 24, 2010, and No. 2010-238246 filed on Oct. 25, 2010, the entire contents of which are incorporated herein by reference.

FIELD

The embodiments discussed herein are related to a route calculating system that calculates a route calculating system for delivering a request flow across a network.

BACKGROUND

In a network including a plurality of nodes and multiple links connecting between the nodes, a flow setting request between nodes (a source node and an destination node) is made in order to send data from a certain terminal to a destination terminal. As used herein, the "flow" is a data flow, and can also be referred as a session or a path. By means of the flow setting request, a route design system operating on a network management system (NMS) that is connected to the respective nodes in the network and manages and controls each node determines an optimal route in the network and accommodates the flow in the determined route.

Conventionally, in order to determine the optimal route, a technique has been proposed in which the route that has the smallest total cost is determined based on objective function (MIN $\{\Sigma i \Sigma j L i, j\}$, where $Li,j$ are link cost values representing the link from the node i to the node j), based on "costs" defined for the links defining the respective routes in accordance with the traffic volume (see Patent References 1 and 2, for example).

The cost, as used herein, is a physical quantity born by each node for traffic processing for the respective flow, concrete examples of which include the transmission power, the reception power, the band of the link, the subscription fee charged for usage of the link.

In addition, in the environment in which each nodes has a DVS (Dynamic Voltage Scaling) feature for controlling the power consumption in accordance with the traffic volume, it has been proposed to give a link cost value corresponding to the power consumptions of the nodes and calculate the minimum cost route (see Patent Reference 3, for example).

PRIOR ART REFERENCES

Patent Document

Patent Reference 1: Japanese Translation of PCT International Application No. 2005-518717
Patent Reference 2: Japanese Laid-open Patent Publication No. 2003-338832
Patent Reference 3: Japanese Laid-open Patent Publication No. 2008-311830

In a node having a power-saving feature for controlling the processing rate in accordance with the traffic, such as the DVS or the ALR (Adaptive Link Rate), as depicted in FIG. 1, for example, it is common to control the power to 0 W at a traffic of 0 Mbps; to 0.1 W in a traffic ranging from 0 Mbps to 10 Mbps; to 0.4 W in a traffic ranging from 10 Mbps to 100 Mbps; and to 3.6 W at a traffic exceeding 100 Mbps.

Conventional route calculating systems calculate a route for anew request flow such that the traffic volume or power consumption of each link is smoothed based on the link cost value of the network when the flow setting request is made.

Let's assume the network depicted in FIG. 2A, for example. In this example, if the traffic volume (transfer volume) of the link from a node A1 to a node C1 is 110 Mbps, and the power consumption of the link from the node A1 to the node C1 is 3.6 W, based on FIG. 1, for example.

In this situation, let's assume the case in which a flow setting request of 10 Mbps is made from the node A1 to a node B1. The traffic volumes of the route of the nodes A1, C1, and B1 are 110 Mbps and 120 Mbps and the power consumptions of the links are 3.6 W and 3.6 W, whereas the traffic volumes of the route of the nodes A1, D1, and B1 are 50 Mbps and 95 Mbps and the power consumptions of the links are 0.4 W and 0.4 W. Thus, conventionally, the route having the smaller traffic volume or power consumption of the link is selected and the route of the nodes A1, D1, and B1 is set as a route for request flow, as depicted in the arrow in FIG. 2B.

When the route of the nodes A1, D1, and B1 is set for the request flow, the traffic volumes are 60 Mbps and 105 Mbps and the power consumptions of the links are 0.4 W and 3.6 W. In this case, the power consumption of the link between the nodes D1 and B1 is increased by 3.2 (=3.6−0.4) W.

In contrast, when the route of the nodes A1, C1, and B1 is set for the request flow, the traffic volumes are 120 Mbps and 130 Mbps and the power consumptions of the links are 3.6 W and 3.6 W, meaning that the power consumptions of the link do not change.

As discussed above, conventional route calculating systems experience the problem in which power consumptions (i.e., the power consumption in the entire network) may be increased for a route that is set for a request flow.

SUMMARY

A route calculating system according to one embodiment disclosed is a route calculation system that calculates a route for passing a request flow in response to a request for flow setting between any of the nodes in a network including a plurality of nodes connected with each other through links, each link having a characteristic in which a link power consumption varied in accordance with a link traffic volume, the route calculation system including: a collection unit that collects a current link traffic volume and a link power consumption for each link included in the network; a link cost calculation unit that estimates, for each link, an increase in the link power consumption due to the request flow based on the current link traffic volume, the link power consumption, the request flow, and the characteristic, and calculates a link cost value based on the increase in the link power consumption; and a route determination unit that determines, as a route for the request flow, a route that has the smallest sum of the link cost values of each route connecting between any nodes.

Furthermore, a route calculating system according to one embodiment disclosed is a route calculation system that calculates a route for passing a request flow in response to a request for flow setting between any of the nodes in a network including a plurality of nodes connected with each other through links, the route calculation system including: a power reduction index value calculation unit that calculates, for each of a plurality of candidate routes connecting between any of the nodes, a power reduction index value representing a possible power consumption reduction by a traffic reduction; and a route determination unit that determines a candidate route having the smallest power reduction index value as a route for the request flow.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 1 is a diagram depicting relationship between the traffic volume and the link power consumption;

FIG. 7 is a diagram illustrating a first embodiment of a link attribute table;

FIG. 13 is a diagram illustrating a second embodiment of a link attribute table;

FIG. 18 is a diagram illustrating a third embodiment of a link attribute table;

FIG. 23 is a diagram illustrating a fourth embodiment of a link attribute table;

FIG. 27 is a diagram illustrating a variant of the fourth embodiment of a link attribute table;

FIG. 35 is a flowchart of the fifth embodiment of network route calculation processing executed by a route calculation unit in the network management system;

FIGS. 36A and 36B are diagrams illustrating a technique to calculate a power reduction index value in a sixth embodiment;

DESCRIPTION OF EMBODIMENT(S)

Hereinafter, embodiments will be described with reference to the drawings.

Network Structure

Figure 2A:
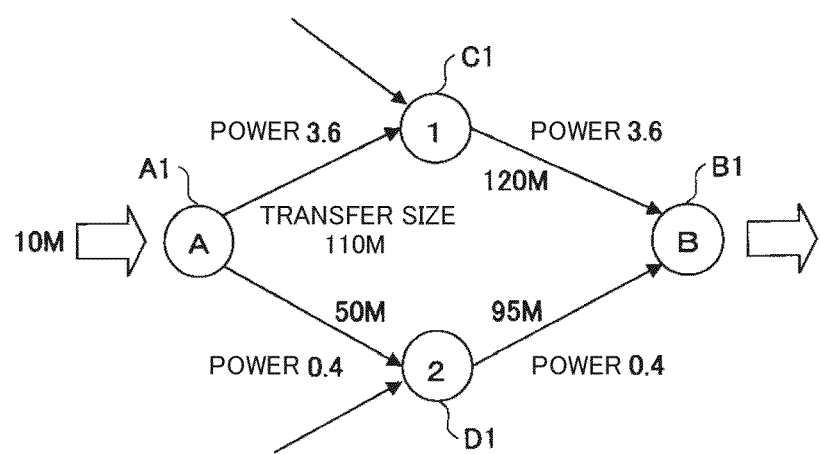
FIGS. 2A and 2B are diagrams illustrating a conventional route setting method.
Figure 2B:
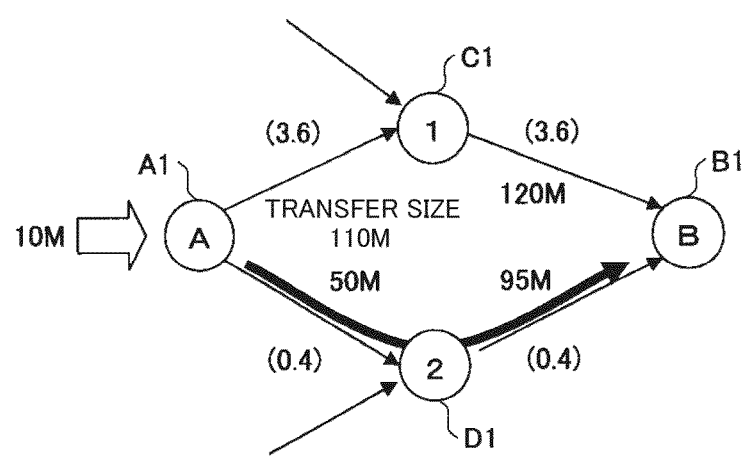
Figure 3:
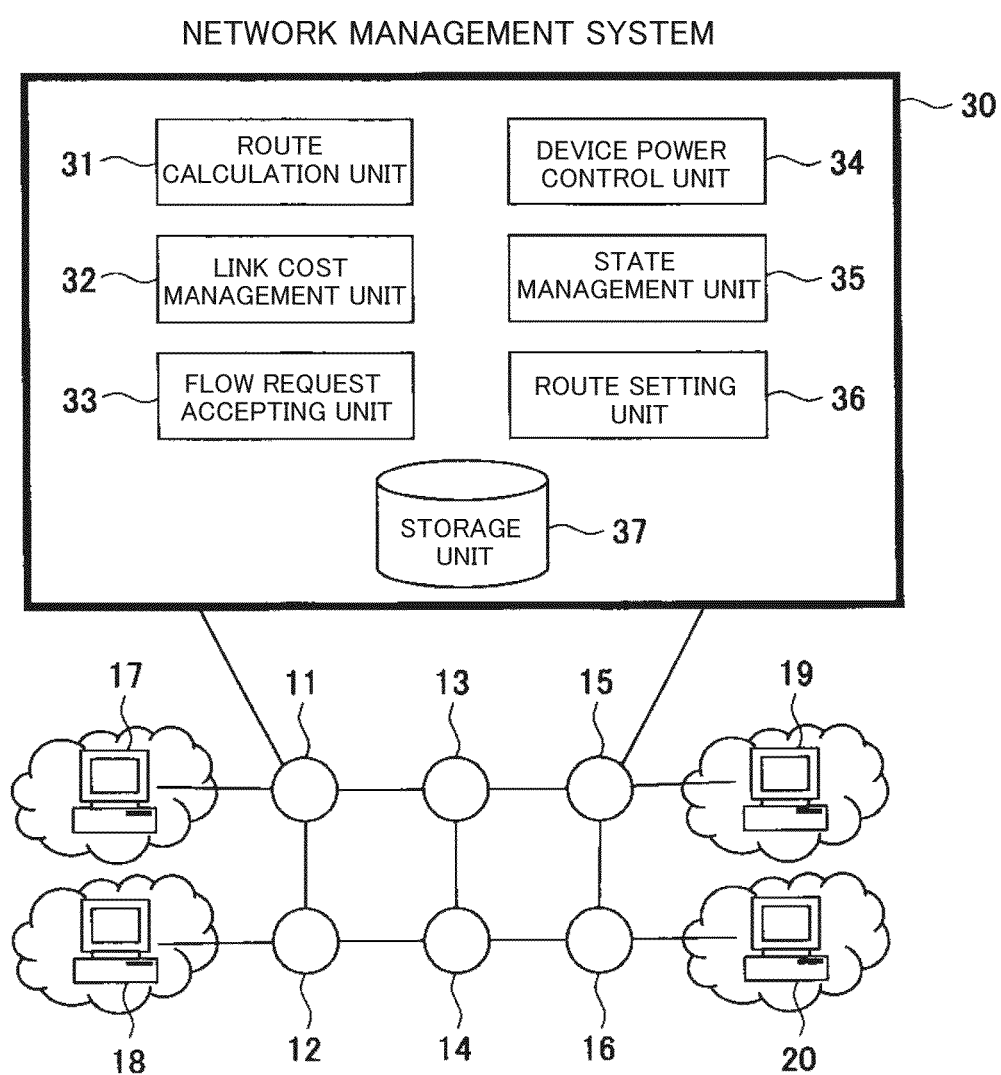
FIG. 3 is a structural diagram of one embodiment of a network management system.

FIG. 3 is a structural diagram of one embodiment of a network management system. In FIG. 3, of the nodes 11 to 16 are coupled with each other through links, such as cables, for example, thereby constructing a network. Terminal apparatuses 17, 18, 19, and 20 are connected to the node 11, 12, 15, and 16, respectively, which are edge nodes of the nodes 11 to 16.

Each of the nodes 11 to 16 are connected to a network management system (NMS) 30 directly or indirectly via other nodes. The network management system 30 is adapted to manage and control the respective nodes 11 to 16, and includes a route calculation unit 31, a link cost management unit 32, a flow request accepting unit 33, a device power control unit 34, a state management unit 35, a route setting unit 36, and a storage unit 37.

The route calculation unit 31 calculates sums of link cost values in a link attribute table for all routes from the start node (source node) to the end node (destination node) specified in the flow setting request, thereby identifying the route that provides the smallest sum of the link cost values.

The link cost management unit 32 estimates the link traffic volume and the link power consumption of each link that are increased by the flow setting request, and the total traffic volume and the power consumption of the endpoint node.

The flow request accepting unit 33 accepts a flow setting request from the nodes 11 to 16 which constitute the network. The device power control unit 34 controls switching of the power-saving operating levels of the nodes 11 to 16 which constitute the network.

The state management unit 35 collects the current link traffic volume and the current link power consumption of each link in the network, as well as the total traffic volume and the power consumption of the endpoint node, and manages them in a link attribute table. The route setting unit 36 makes a route setting such that the request flow is passed for nodes that are determined as the route of the request flow. The storage unit 37 stores the link attribute table and the like.

Figure 4:
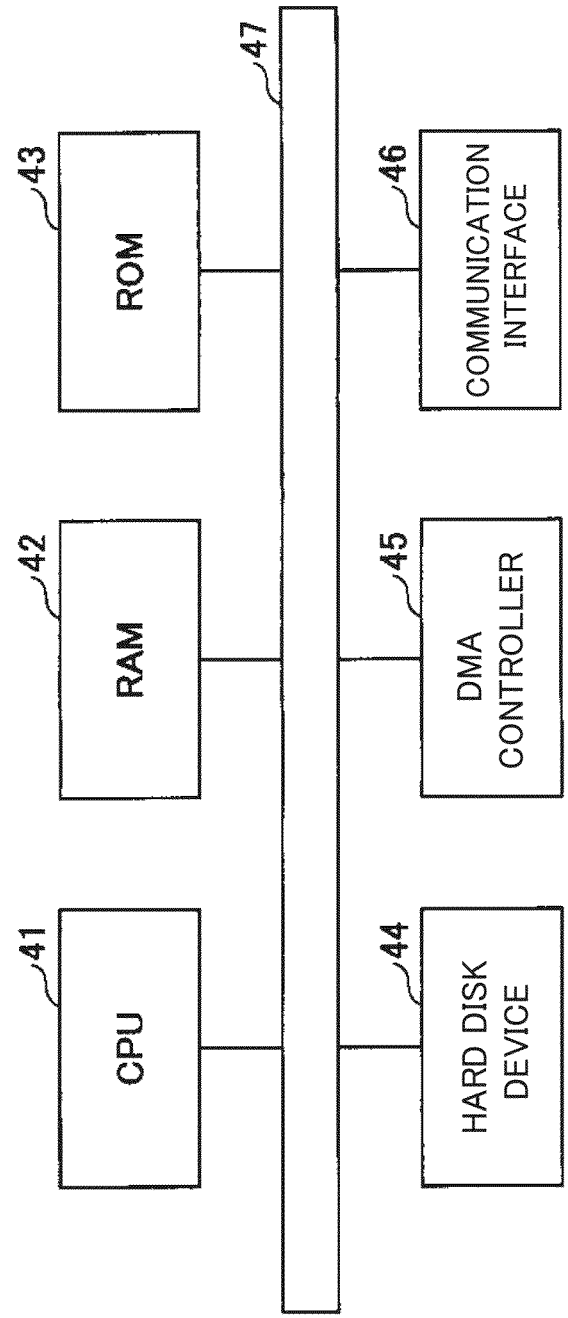
FIG. 4 is a hardware structural diagram of one embodiment of a network management system.

FIG. 4 depicts a hardware structural diagram of one embodiment of a network management system 30. In FIG. 4, the network management system 30 includes a CPU 41, a RAM 42, a ROM 43, a hard disk device 44, a DMA controller 45, a communication interface 46, which are connected with other via an internal bus 47.

The CPU 41 executes various types of processing, such as route determination processing, link cost management processing, flow request acceptance processing, device power control processing, state management processing, route setting processing, by executing software stored in the RAM 42, the ROM 43, the hard disk device 44, or the like. In addition, the RAM 42 is used as a work area when executing various types of processing, and the hard disk device 44 is used as the storage unit 37. The DMA controller 45 permits higher-speed data transfers between the hard disk device 44 and the communication interface 46, for example. The communication interface 46 is connected to a part or all of the nodes 11 to 16, and provides communications among the nodes 11-16.

First Embodiment

Figure 5:
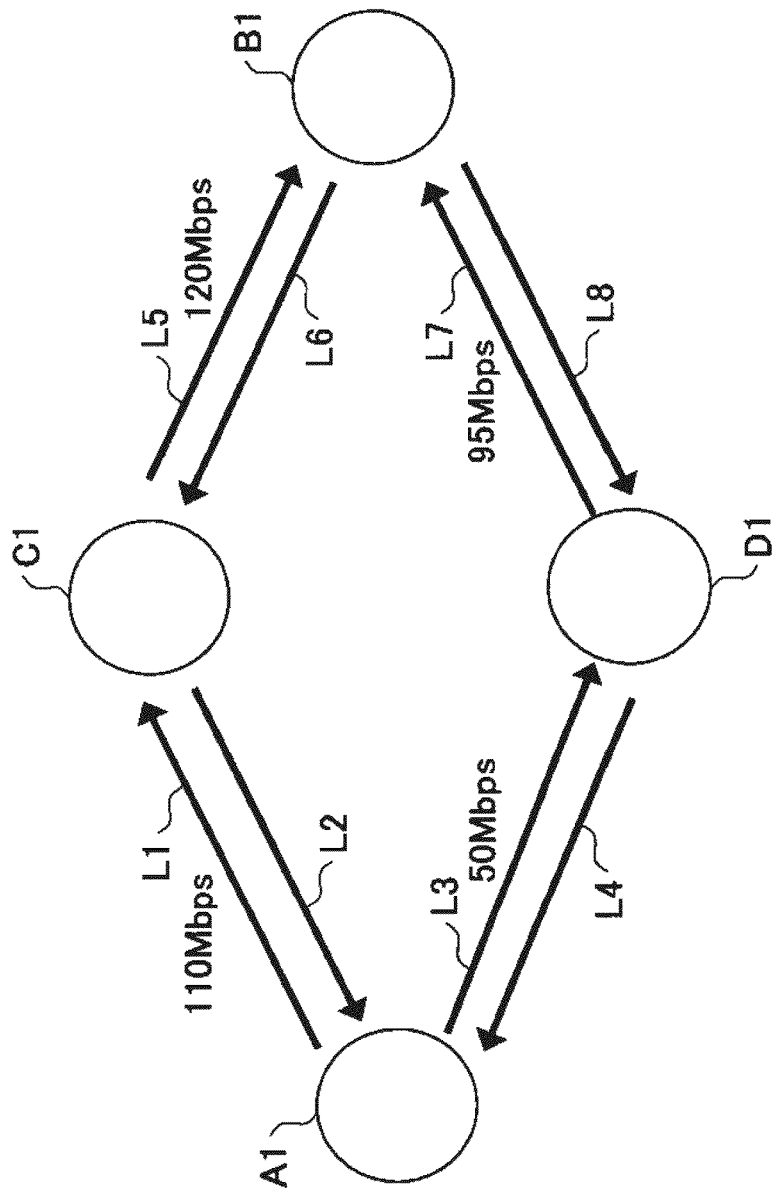
FIG. 5 is a diagram illustrating the structure of a network.

As depicted in FIG. 5, the network is constructed such that nodes A1 and C1 are coupled together through links L1 and L2 indicated by the arrows; nodes A1 and D1 are coupled together through links L3 and L4; nodes C1 and B1 are coupled together through links L5 and L6; and nodes D1 and B1 are coupled together through links L7 and L8, wherein terminal apparatuses provided at the respective points are connected to the nodes A1 and B1.

In this case, each link manages link traffic volumes (transfer volumes) having particular transfer directions. In addition, the link power consumption is determined (power-saving operating level=3.6 W), for the links L1 and L2 between the nodes A1 and C1, for example, by the link L1 which has a greater link traffic volume.

Figure 6:
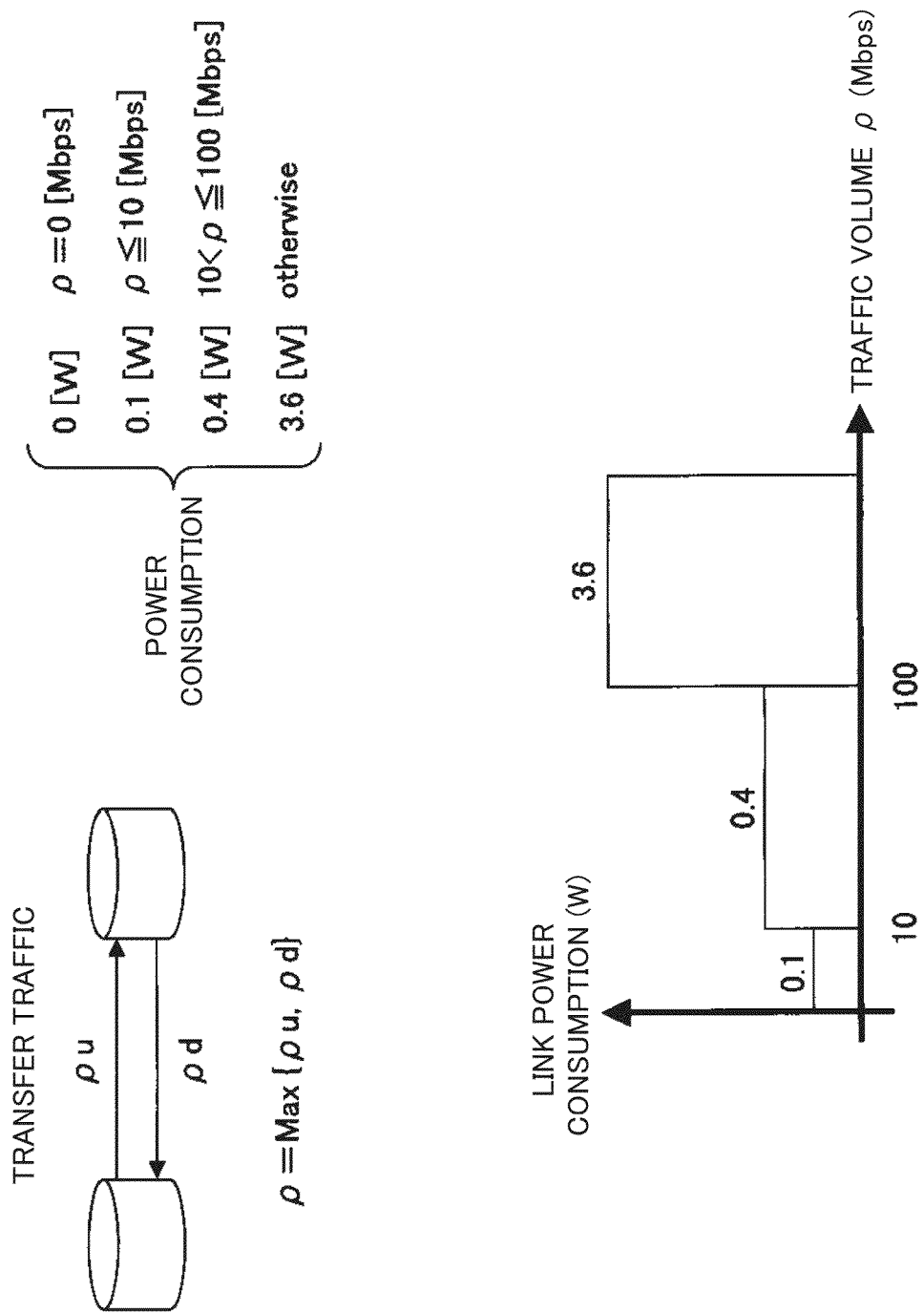
FIG. 6 is a diagram depicting relationship between the link traffic volumes and the link power consumptions.

FIG. 6 depicts one example of the relationship between link traffic volume $\rho u$ and $\rho d$ and the link power consumption for two bi-directional links connecting two nodes. The link power consumption is a discrete value, and is varied stepwise in accordance with the greater link traffic volume of the bi-directional link traffic volumes $\rho u$ and $\rho d$. That is, the link power consumption is 0 W for a link traffic volume of 0 Mbps; the link power consumption is 0.1 W in a traffic volume ranging from 0 Mbps to 10 Mbps; to 0.4 W in a traffic volume ranging from 10 Mbps to 100 Mbps; and to 3.6 W at a traffic volume exceeding 100 Mbps.

FIG. 7 depicts a first embodiment of a link attribute table that is stored in the storage unit 37 and managed by the state management unit 35 and the link cost management unit 32 in the network management system 30. The link attribute table stores a endpoint node, a current link traffic volume, and a current link power consumption for each link.

In addition, in response to a flow setting request, a link traffic volume upon addition of a new flow and a link power consumption upon addition of a new flow are estimated by the link cost management unit 32, and the difference between the link power consumption upon addition of a new flow and the current link power consumption is stored in the link attribute table, as a link cost value, for each link. If the link power consumption upon addition of a new flow and the current link power consumption are the same, the link cost value is set to a minute value $\delta 1$ (0.001, for example), for indicating that the power consumption is not changed.

Although the relationship depicted in FIG. 6 is stored for each link as a link power consumption characteristic in the example in FIG. 7, the relationship depicted in FIG. 6 is not restricting and different link power consumption characteristics may be used for different links.

Figure 8:
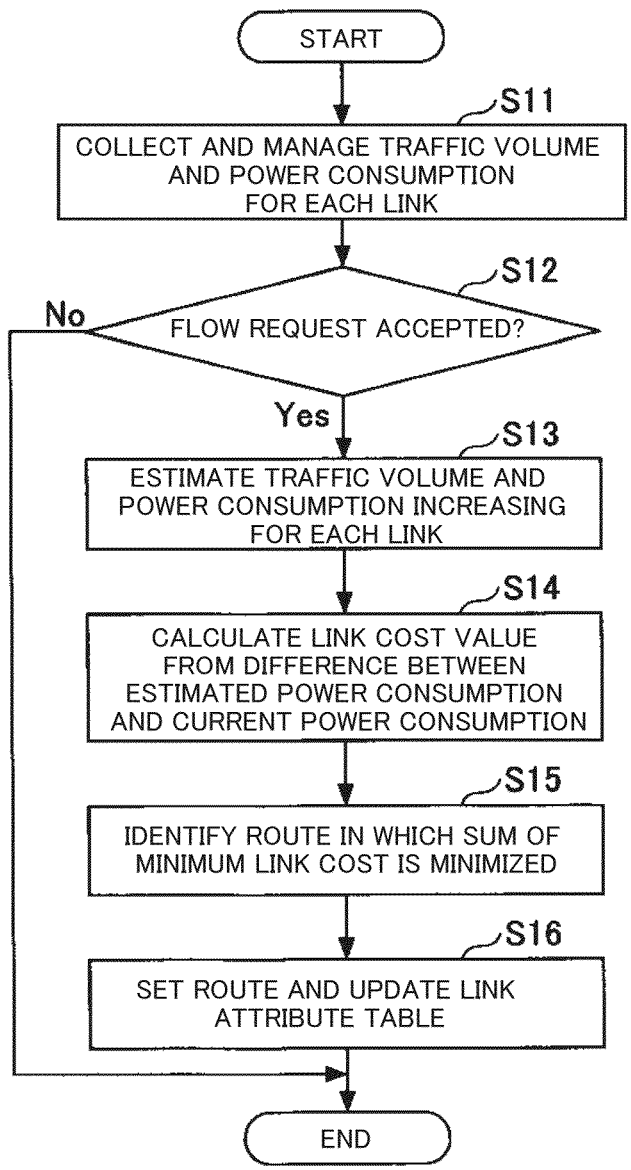
FIG. 8 is a flowchart of a first embodiment of route calculation processing.

FIG. 8 is a flowchart of a first embodiment of network route calculation processing executed by the route calculation unit 31 in the network management system 30. The processing is repeatedly executed at regular intervals. In FIG. 8, the state management unit 35 collects the current link traffic volume and the current link power consumption of each link in the network and manages them in a link attribute table in Step S11.

In Step S12, it is determined whether or not a flow setting request (including a start node, an end node, and a traffic volume) is accepted by the flow request accepting unit 33 from a node included in the network. If a flow setting request is accepted, the processing proceeds to Step S13. If no flow setting request is accepted, the processing is terminated.

In Step S13, the link cost management unit 32 estimates the link traffic volume and the link power consumption (upon addition of a new flow) that are increased due to the request flow, for each link, and stores them in the link attribute table.

Subsequently, in Step S14, the link cost management unit 32 calculates the difference between the link power consumption upon addition of a new flow and the current link power consumption, and stores it in the link attribute table as a link cost value.

In Step S15, the route calculation unit 31 calculates sums of link cost values in a link attribute table for all routes from the start node (source node) to the end node (destination node) specified in the flow setting request, thereby identifying the route that provides the smallest sum of the link cost values as a route for the request flow.

Thereafter, in Step S16, the route setting unit 36 makes a route setting such that the request flow is passed for nodes that are determined as the route of the request flow. The route setting unit 36 also stores, in link attribute table, the link traffic volume and the link power consumption (upon addition of a new flow) estimated in Step S13 as the current link traffic volume and the current link power consumption, for the links defining the route for the request flow. The route setting unit 36 further updates the link traffic volume, the link power consumption, and the link cost value estimated for each link updates by clearing them by setting to zero, and the processing is terminated.

In the above-described embodiment, it has been described that, when a new flow is set for one of the nodes 11 to 16 from the network management system 30, the link power consumption is varied in each node having an increased link traffic volume in the relationship depicted in FIG. 6. However, when the power-saving operating level (power consumption operation level) of the link power consumption of each node is switched among levels of 0.1 W, 0.4 W, and 3.6 W, under the control of the network management system 30, the device power control unit 34 in the network management system 30 controls switching of the power-saving operating level for any nodes requiring switching of the power-saving operating level.

Figure 9:
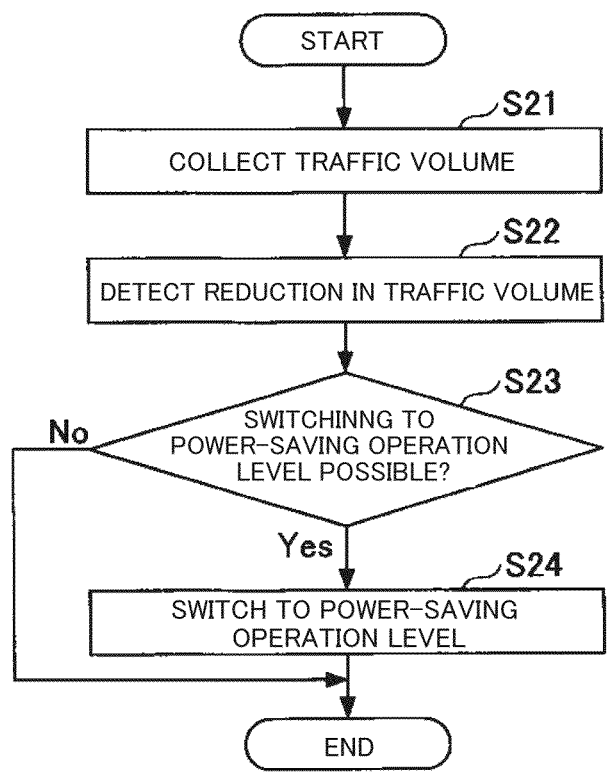
FIG. 9 is a flowchart of one embodiment of the processing upon traffic reduction.

FIG. 9 depicts a flowchart of one embodiment of the processing upon traffic reduction by the route calculation unit 31 in the network management system 30 when the power-saving operating level of each node is switched from the network management system 30. The processing is repeatedly executed at regular intervals. In FIG. 9, the state management unit 35 collects the current link traffic volume for each link in the network in Step S21. In Step S22, the state management unit 35 identifies a link having a reduced link traffic volume. In Step S23, it is determined whether or not that link corresponds to a node requiring switching of the power-saving operating level. Switching of the power-saving operating level of the link is executed only for node requiring switching of the power-saving operating level in Step S24, and the processing is terminated.

Figure 10A:
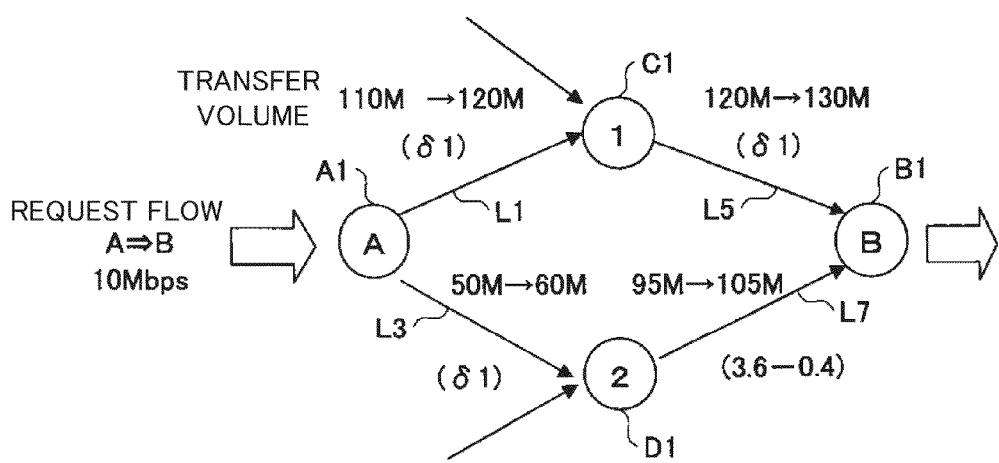
FIGS. 10A and 10B are diagrams illustrating a route setting method of a first embodiment.

In this case, as depicted in FIG. 10A, the current link traffic volume in the link L1 is 110 Mbps, whereas the current link traffic volume in the link L3 is 50 Mbps. In addition, the current link traffic volume in the link L5 is 120 Mbps, whereas the current link traffic volume in the link L7 is 95 Mbps. When a flow setting request of 10 Mbps is made from the node to the node B1 in this scenario, the link cost value of the link L1 is δ1, the link cost value of the link L3 is δ1, the link cost value of the link L5 is δ1, and the link cost value of the link L7 is 3.2 (=3.6−0.4).

Figure 10B:
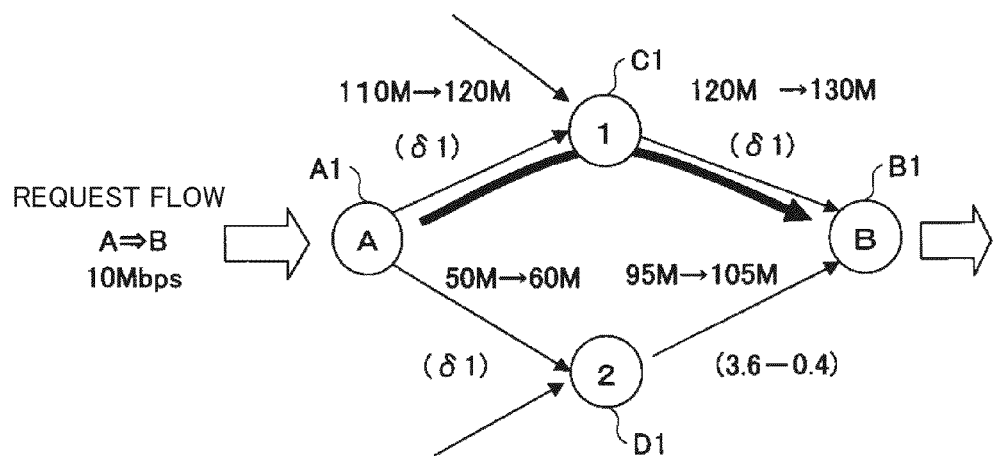

Accordingly, the sum of the link cost values of the route of the nodes A1, C1, and B1 is 2×δ1, and the sum of the link cost values of the route of the route of the nodes A1, D1, and B1 is δ1+3.2. As indicated by the arrow in FIG. 10B, the route of the nodes A1, C1, and B1 which has the smallest sum is determined as a route for the request flow.

Second Embodiment

The first embodiment assumes an environment in which the link power consumption is varied in stepwise with respect to the link traffic volume. In some nodes, the node power consumption is varied in stepwise with respect to the total traffic volume. As a second embodiment, route determination processing will be described with reference to an environment in which the node power consumption is varied in stepwise in accordance with the total traffic volume flowing into the node.

Figure 11:
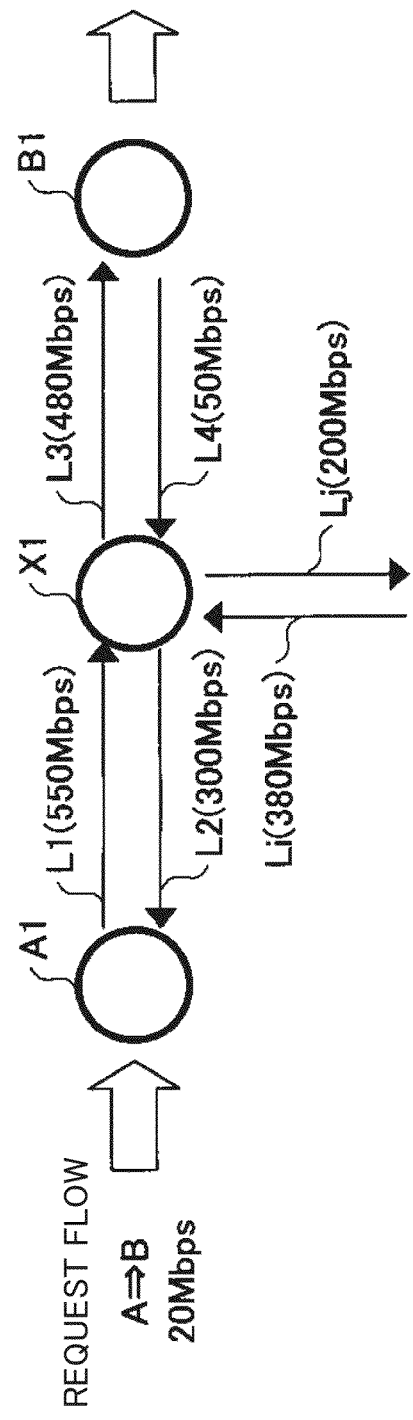
FIG. 11 is a diagram illustrating the structure of a network.

As depicted in FIG. 11, nodes A1 and X1 are coupled with each other through links L1 and L2 indicated by the arrows; nodes X1 and B1 are coupled with each other through links L5 and L6; and the node X1 is further coupled to other nodes through links Li and Lj, wherein terminal apparatuses provided at the respective points are connected to the nodes A1 and B1. In this case, each link manages link traffic volumes (transfer volumes) having particular transfer directions, as well as managing the total traffic volume flowing into the node. When L1=550 Mbps, L2=300 Mbps, L3=480 Mbps, L4=50 Mbps, Li=380 Mbps, and Lj=200 Mbps are assumed, the total traffic volume in the node X1 is 980 (=550+50+380).

Figure 12:
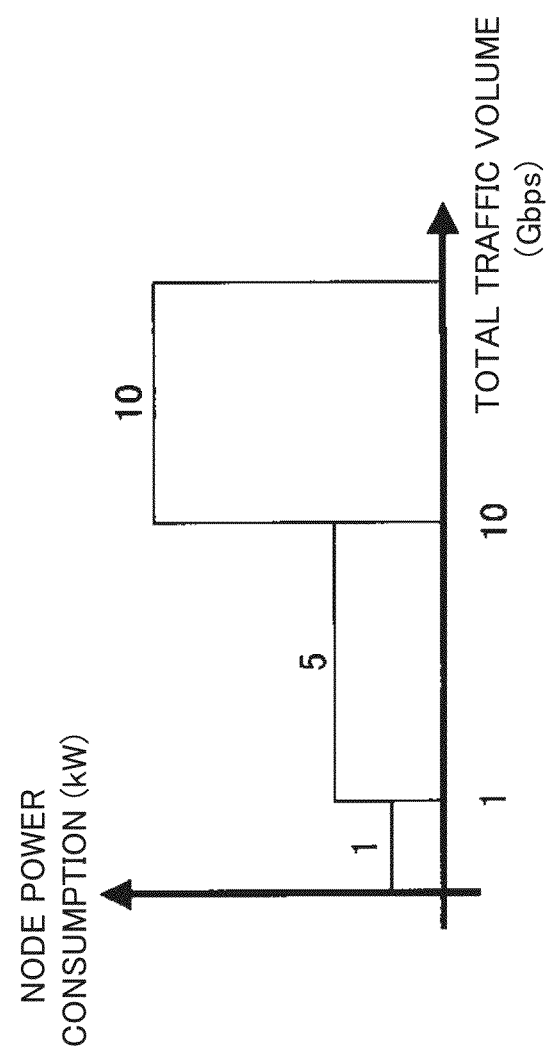
FIG. 12 is a diagram depicting relationship between the total traffic volume and the node power consumption.

FIG. 12 depicts a diagram depicting the relationship between the total traffic volume flowing into the node and the node power consumption. The node power consumption is a discrete value, and is varied in stepwise with respect to the total traffic volume flowing into the node. That is, the node power consumption is 0 W for a total traffic volume of 0 Gbps; the node power consumption is 1 kW in a total traffic volume ranging from 0 Gbps and 1 Gbps; the node power consumption is 5 kW in a total traffic volume ranging from 1 Gbps and 10 Gbps; and the node power consumption is 10 kW at a total traffic volume exceeding 10 Gbps.

FIG. 13 depicts a second embodiment of a link attribute table that is stored in the storage unit 37 and managed by the state management unit 35 and the link cost management unit 32 in the network management system 30. The link attribute table stores a endpoint node, a total traffic volume in the current endpoint node, and a power consumption in the current endpoint node for each link.

In addition, in response to a flow setting request, a total traffic volume of the endpoint node upon addition of a new flow and a power consumption of the endpoint node upon addition of a new flow are estimated by the link cost management unit 32, and the difference between the total traffic volume of the endpoint node upon addition of a new flow and the power consumption of the endpoint node is stored in the link attribute table, as a link cost value, for each link. If the power consumption of the endpoint node upon addition of a new flow and the power consumption of the current endpoint node are the same, the link cost value is set to a minute value δ2 (0.0005 or 0.001 or 0.002, for example), for indicating that the power consumption is not changed.

Although the relationship depicted in FIG. 12 is stored for each link as the power consumption characteristic of the node to which each link connects in the example in FIG. 13, the relationship depicted in FIG. 12 is not restricting and different node power consumption characteristics may be used for different links.

Figure 14:
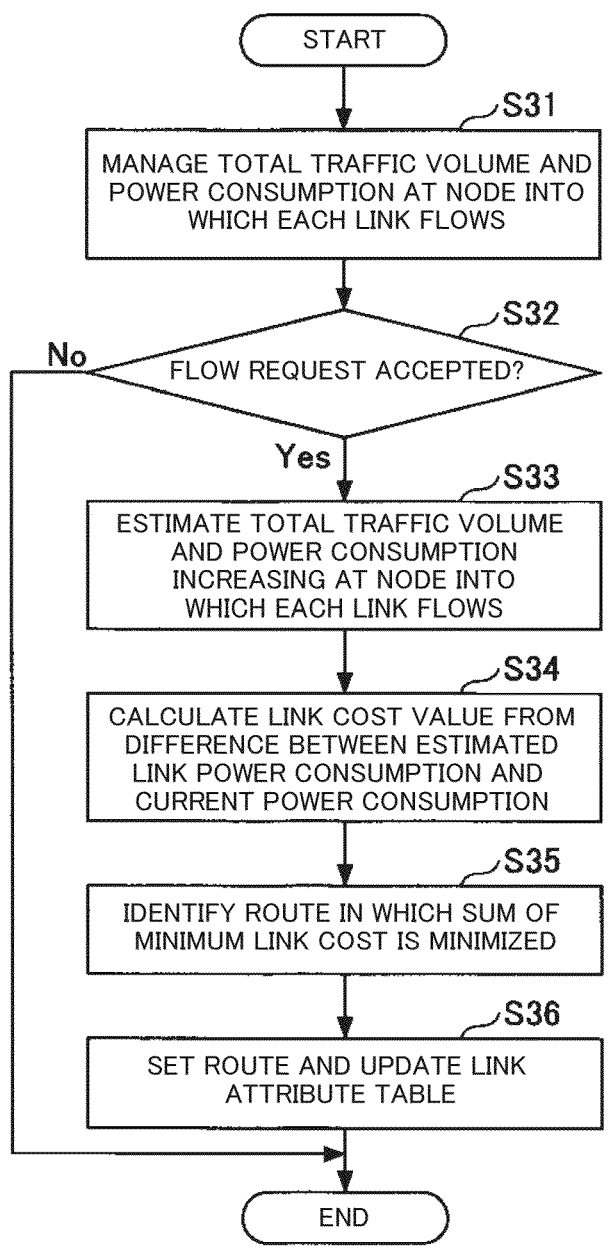
FIG. 14 is a flowchart of a second embodiment of route calculation processing.

FIG. 14 is a flowchart of a second embodiment of network route calculation processing executed by the route calculation unit 31 in the network management system 30. The processing is repeatedly executed at regular intervals. In FIG. 14, the state management unit 35 collects the total traffic volume and the power consumption in the current endpoint node of each link in the network and manages them in a link attribute table in Step S31.

In Step S32, it is determined whether or not a flow setting request (including a start node, an end node, and a traffic volume) is accepted by the flow request accepting unit 33 from a node included in the network. If a flow setting request is accepted, the processing proceeds to Step S33. If no flow setting request is accepted, the processing is terminated.

In Step S33, the link cost management unit 32 estimates the total traffic volume and the power consumption in the endpoint node (upon addition of a new flow) that are increased due to the request flow, for each link, and stores them in the link attribute table.

Subsequently, in Step S34, the link cost management unit 32 calculates the difference between the power consumption of the endpoint node upon addition of a new flow and the power consumption of the current endpoint node, and stores it in the link attribute table as a link cost value. In Step S35, the route calculation unit 31 calculates sums of link cost values in a link attribute table for all routes from the start node (source node) to the end node (destination node) specified in the flow setting request, thereby identifying the route that provides the smallest sum of the link cost values as a route for the request flow.

Thereafter, in Step S36, the route setting unit 36 makes a route setting such that the request flow is passed for nodes that are determined as the route of the request flow. The route setting unit 36 also stores, in link attribute table, the total traffic volume and the power consumption of the endpoint node (upon addition of a new flow) estimated in Step S33 as the total traffic volume of the current endpoint node and the current link power consumption, for the links defining the route for the request flow. The route setting unit 36 further updates the link total volume of the endpoint node, the power consumption, and the link cost value estimated for each link updates by clearing them by setting to zero, and the processing is terminated.

Third Embodiment

As a third embodiment, route determination processing will be described in an environment in which the link power consumption is varied in stepwise with respect to the link traffic volume, and the node power consumption is also varied in stepwise in accordance with the total traffic volume flowing into the node.

Figure 15:
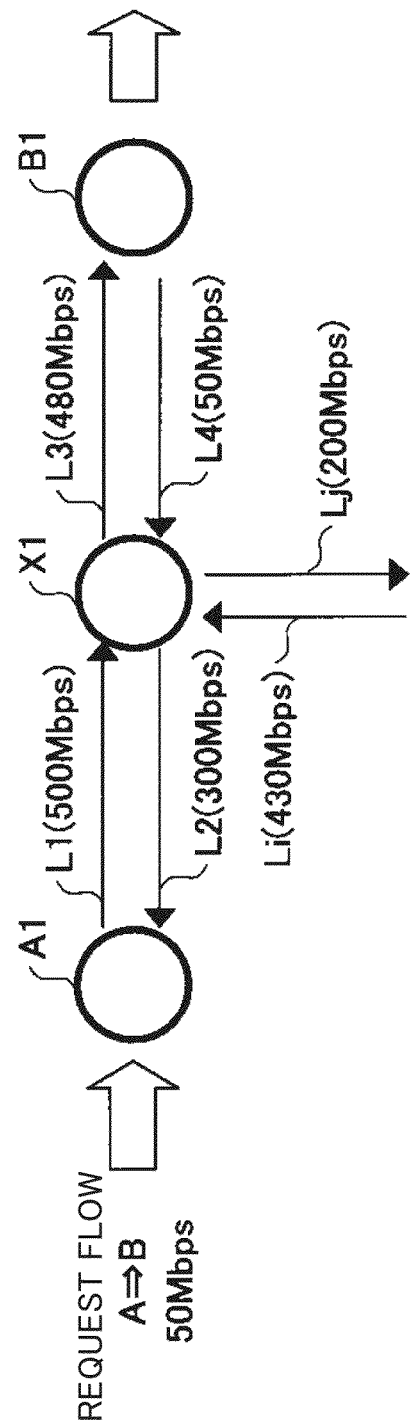
FIG. 15 is a diagram illustrating the structure of a network.

As depicted in FIG. 15, nodes A1 and X1 are coupled with each other through links L1 and L2 indicated by the arrows; nodes X1 and B1 are coupled with each other through links L5 and L6; and the node X1 is further coupled to other nodes through links Li and Lj, wherein terminals provided at the respective points are connected to the nodes A1 and B1. In this case, each link manages link traffic volumes (transfer volumes) having particular transfer directions, as well as managing the total traffic volume flowing into the node. When L1=500 Mbps, L2=300 Mbps, L3=480 Mbps, L4=50 Mbps, Li=430 Mbps, and Lj=200 Mbps are assumed, the total traffic volume flowing into the node X1 is 980 (=550+50+380). In addition, the link power consumption is determined (=power-saving operating level=0.1 W), for the links L1 and L2 between the nodes A1 and C1, for example, by the link L1 which has a greater link traffic volume.

Figure 16:
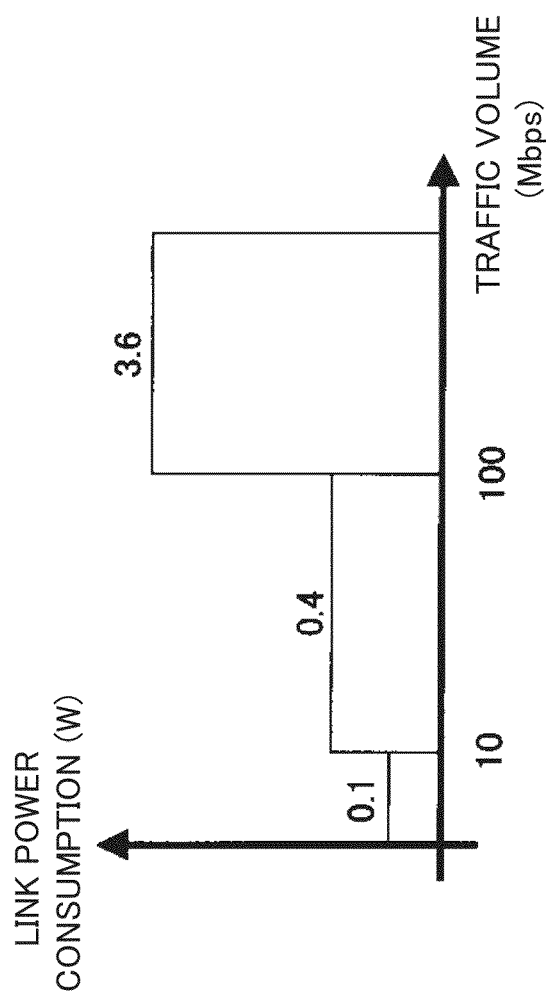
FIG. 16 is a diagram depicting relationship between the link traffic volumes and the link power consumptions.

FIG. 16 depicts one embodiment of the relationship between the link traffic volume and the link power consumption. The link power consumption is a discrete value, and is varied stepwise in accordance with the greater link traffic volume of the bi-directional link. That is, the link power consumption is 0 W for a link traffic volume of 0 Mbps; the link power consumption is 0.1 W in a traffic volume ranging from 0 Mbps to 10 Mbps; to 0.4 W in a traffic volume ranging from 10 Mbps to 100 Mbps; and to 3.6 W at a traffic volume exceeding 100 Mbps.

Figure 17:
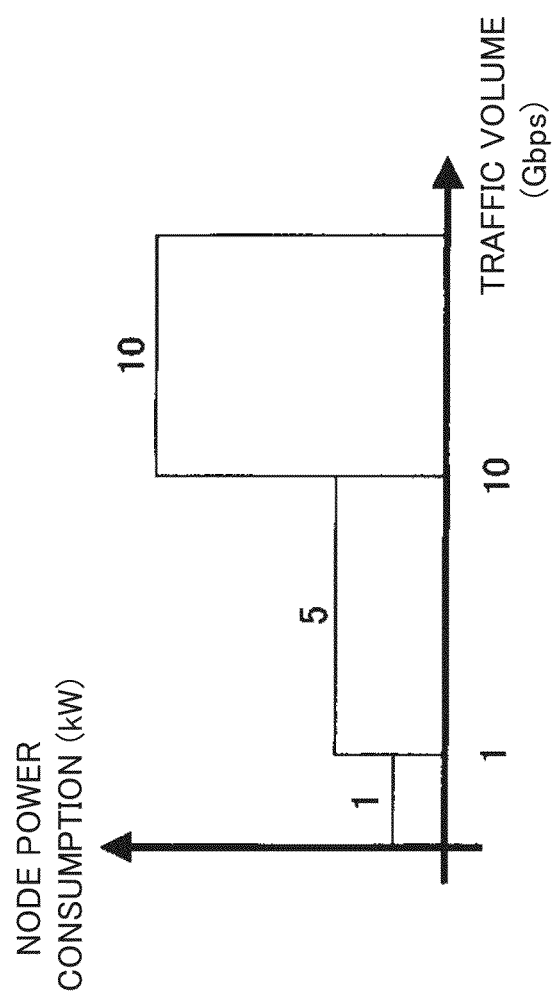
FIG. 17 is a diagram depicting relationship between the total traffic volume flowing into the node and the node power consumption.

FIG. 17 depicts a diagram depicting relationship between the total traffic volume flowing into the node and the node power consumption. The node power consumption is a discrete value, and is varied in stepwise with respect to the total traffic volume flowing into the node. That is, the node power consumption is 0 W for a total traffic volume of 0 Gbps; the node power consumption is 1 kW in a total traffic volume ranging from 0 Gbps and 1 Gbps; the node power consumption is 5 kW in a total traffic volume ranging from 1 Gbps and 10 Gbps; and the node power consumption is 10 kW at a total traffic volume exceeding 10 Gbps.

FIG. 18 depicts a third embodiment of a link attribute table that is stored in the storage unit 37 and managed by the state management unit 35 and the link cost management unit 32 in the network management system 30. The link attribute table stores a endpoint node, a current link traffic volume, and a current link power consumption for each link, the endpoint node, a total traffic volume in the current endpoint node, and a power consumption in the current endpoint node.

In addition, in response to a flow setting request, the link traffic volume upon addition of a new flow, the link power consumption upon addition of a new flow, a total traffic volume of the endpoint node upon addition of a new flow, and a power consumption of the endpoint node upon addition of a new flow are estimated by the link cost management unit 32. The sum of the difference between the link power consumption upon addition of a new flow and the current link power consumption and the difference between the total traffic volume of the endpoint node upon addition of a new flow and the power consumption of the current endpoint node is stored in the link attribute table, as a link cost value, for each link.

If the link power consumption upon addition of a new flow and the current link power consumption are the same, the link cost value is set to a minute value δ1. If the power consumption of the endpoint node upon addition of a new flow and the power consumption of the current endpoint node are the same, the link cost value is set to a minute value δ2.

Figure 19:
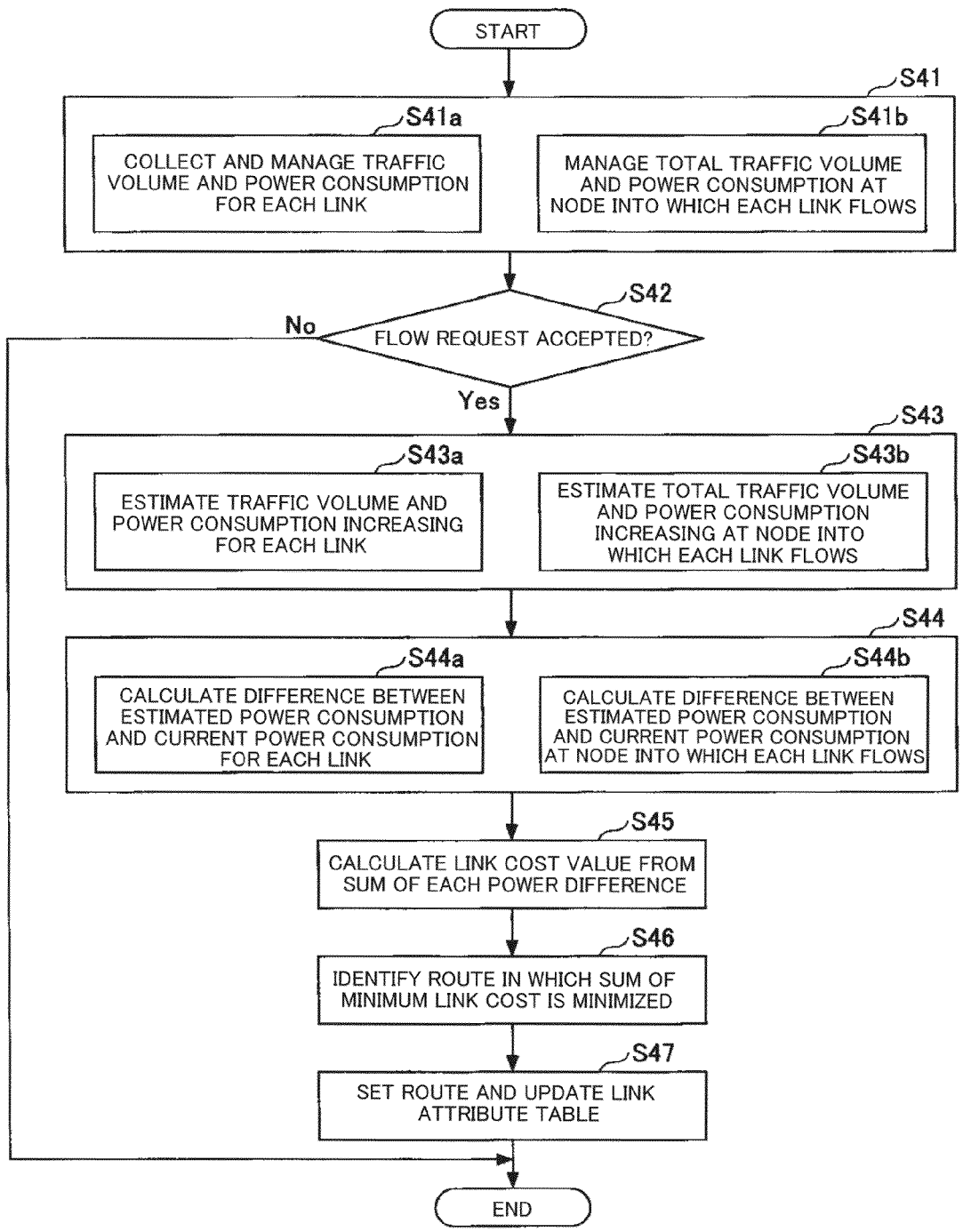
FIG. 19 is a flowchart of a third embodiment of route calculation processing.

FIG. 19 is a flowchart of a third embodiment of network route calculation processing executed by the route calculation unit 31 in the network management system 30. The processing is repeatedly executed at regular intervals. In FIG. 19, Step S41 includes Step S41a and Step S41b, either one of which may be executed first. In Step 41a, the state management unit 35 collects the current link traffic volume and the current link power consumption of each link in the network and manages them in a link attribute table. In Step 41b, the state management unit 35 collects the total traffic volume and the power consumption in the current endpoint node of each link in the network and manages them in a link attribute table.

In Step S42, it is determined whether or not a flow setting request (including a start node, an end node, and a traffic volume) is accepted by the flow request accepting unit 33 from a node included in the network. If a flow setting request is accepted, the processing proceeds to Step S43. If no flow setting request is accepted, the processing is terminated.

Step S43 includes Step S43a and Step S43b, either one of which may be executed first. In Step S43a, the link cost management unit 32 estimates the link traffic volume and the link power consumption (upon addition of a new flow) that are increased due to the request flow, for each link, and stores them in the link attribute table. In Step S43b, the link cost management unit 32 estimates the total traffic volume and the power consumption in the endpoint node (upon addition of a new flow) that are increased due to the request flow, for each link, and stores them in the link attribute table.

Subsequently, Step S44 includes Step S44a and Step S44b, either one of which may be executed first. In Step S44a, the link cost management unit 32 calculates the difference between the link power consumption upon addition of a new flow and the current link power consumption. In Step S44b, the link cost management unit 32 calculates the difference between the power consumption of the endpoint node upon addition of a new flow and the power consumption of the current endpoint node.

In Step S45, the link cost management unit 32 determines the sum of the difference between the link power consumption upon addition of a new flow and the current link power consumption and the difference between the power consumption of the endpoint node upon addition of a new flow and the power consumption of the current endpoint node, and stores it in the link attribute table as a link cost value.

In Step S46, the route calculation unit 31 calculates sums of link cost values in a link attribute table for all routes from the start node (source node) to the middle node (destination node) specified in the flow setting request, thereby identifying the route that provides the smallest sum of the link cost values as a route for the request flow.

Thereafter, in Step S47, the route setting unit 36 makes a route setting such that the request flow is passed for nodes that are determined as the route of the request flow. The route setting unit 36 also stores, in link attribute table, the link traffic volume and the link power consumption estimated in Step S43a as the current link traffic volume and the current link power consumption, and stores the total traffic volume and the power consumption of the endpoint node (upon addition of a new flow) estimated in Step S43b as the total traffic volume of the current endpoint node and the current link power consumption, for the links defining the route for the request flow. The route setting unit 36 further updates the link traffic volume, the link power consumption, and the link cost value estimated for each link, and the total traffic volume and the power consumption in the endpoint node (upon addition of a new flow) by clearing them by setting to zero, and the processing is terminated.

Fourth Embodiment

In the first to third embodiments described above, the link cost of each link is determined based on the changes in the link traffic volume of two bi-directional links (for example, the links L1 and L2) connecting between two nodes (for example, the nodes A1 and C1).

In this fourth embodiment, upon determination of link costs of two bi-directional logical links (hereinafter, simply referred to as "links") related to a single physical link (physical line), the link power consumption is determined based on the link having a greater link traffic volume of the two bi-directional links, thereby determining the link cost.

More specifically, for a link of two bi-directional logical links related to a single physical link, for which the link cost is to be determined (hereinafter, such a link is sometimes referred to as a "target link"), the transfer rate is determined in accordance with the link traffic volume of the link having a greater link traffic volume of the two bi-directional links. The link power consumption for operating at that transfer rate is determined and the link cost of the target link is calculated.

Figure 20:
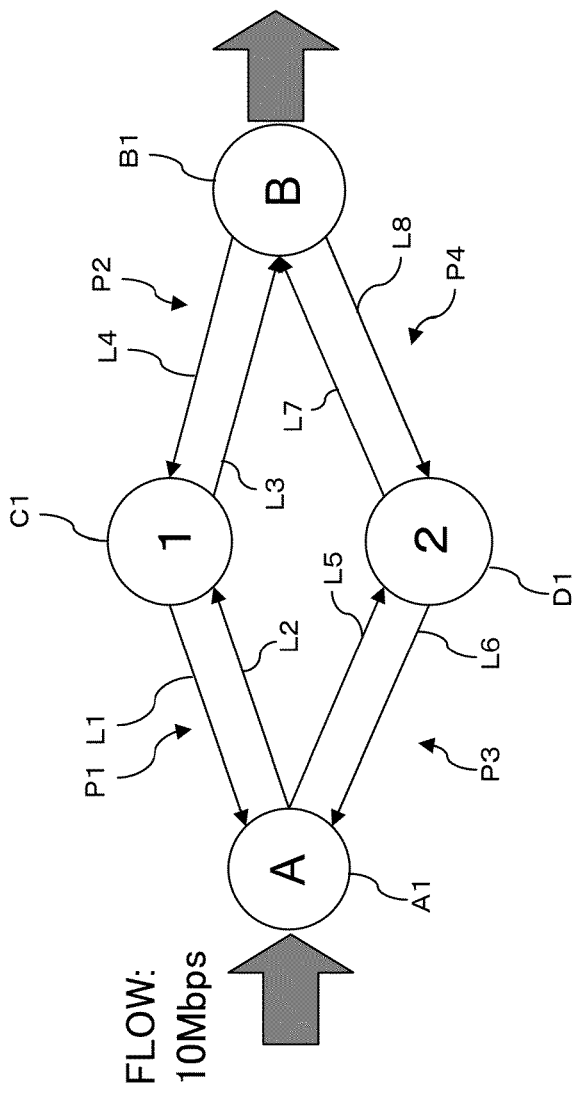
FIG. 20 is a diagram exemplifying the structure of the network.
Figure 21:
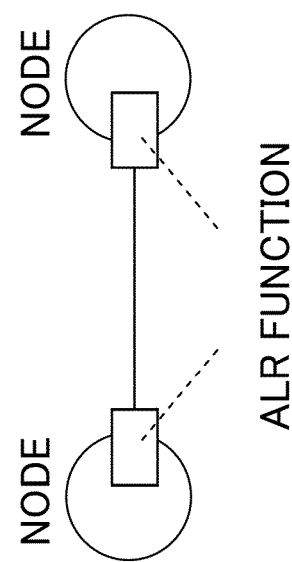
FIG. 21 is a diagram illustrating the ALR feature.
Figure 22:
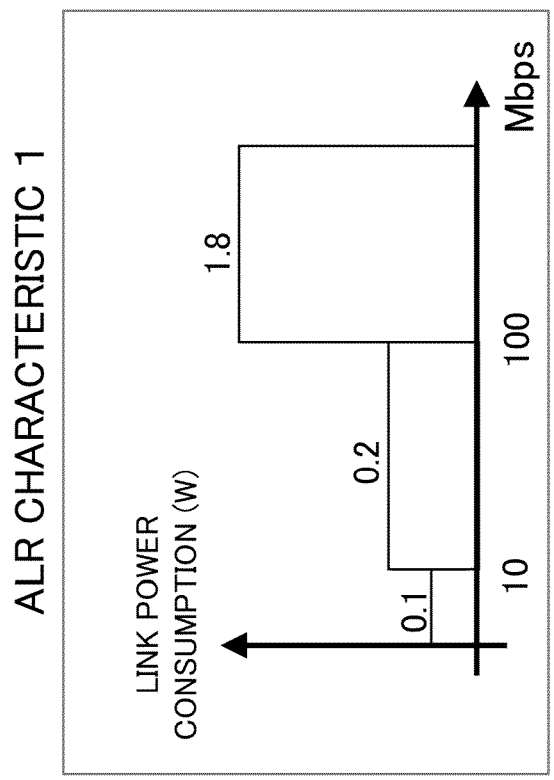
FIG. 22 is a diagram exemplifying an ALR characteristic.
Figure 24:
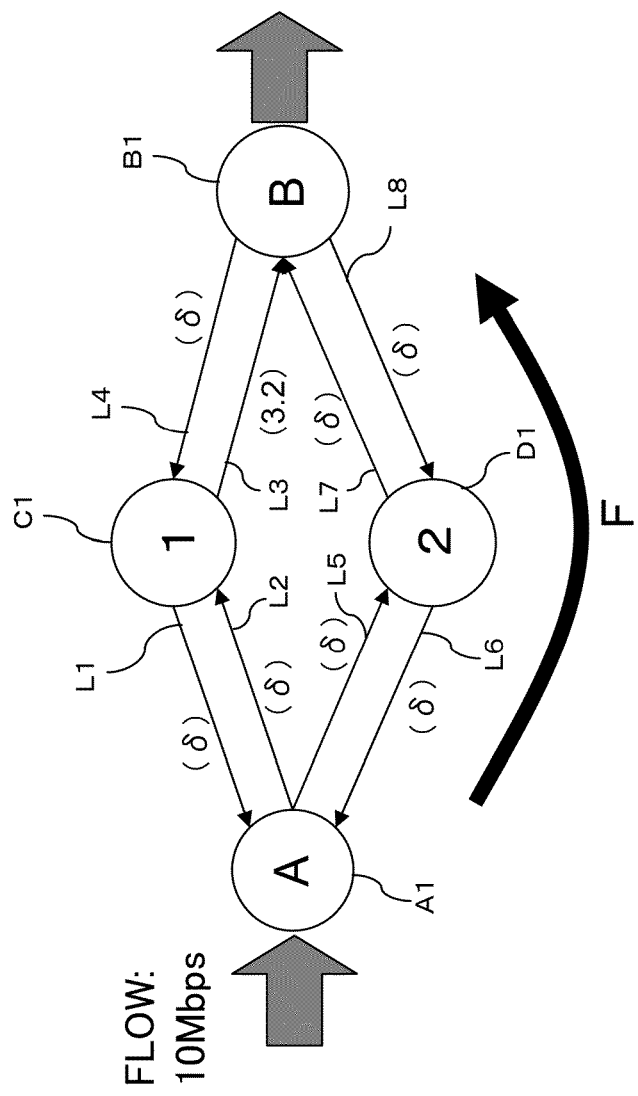
FIG. 24 is a diagram illustrating a route that is determined.

FIG. 20 is a diagram exemplifying the structure of the network of the forth embodiment; FIG. 21 is a diagram illustrating the ALR feature; and FIG. 22 is a diagram exemplifying an ALR characteristic thereof. In addition, FIG. 23 is a diagram illustrating a fourth embodiment of a link attribute table; and FIG. 24 is a diagram illustrating a route that is determined.

The reference symbols that have been described above refer to the same or substantially the same portions referenced to in the foregoing drawings, and their detailed description will be omitted.

Let's assume a network constituted by a node A1, a node B1, a node C1 and a node D1, as depicted in FIG. 20, for example.

This network is connected to a network management system 30, and the network management system 30 accepts request flows, as well as selecting and setting transfer routes.

As depicted in FIG. 20, the network is constructed such that nodes A1 and C1 are coupled together through a physical link P1 indicated by the arrows; nodes A1 and D1 are coupled together through a physical link P3; nodes C1 and B1 are coupled together through a physical link P2; and nodes D1 and B1 are coupled together through a physical link P4, wherein terminal apparatuses provided at the respective points are connected to the nodes A1 and B1.

In addition, the physical link P1 is managed as separate bi-directional logical links (links) L1 and L2, indicated by the arrows. Similarly, the physical link P2 is managed as separate links L3 and L4, indicated by the arrows; the physical link P3 is managed as separate links L3 and L4; and the physical link P4 is managed as separate links L7 and L8.

Additionally, as depicted in FIG. 21, each node includes a communication adaptor AD, which communicatively connects the node to another node through the physical link. Each communication adaptor AD includes the ALR feature.

The ALR feature determines an appropriate transfer rate in accordance with the link traffic volume of the link having a greater load of the bi-directional links, and determines the power consumption for operating at that transfer rate. The ALR feature manages links (the links L1 and L2, for example) on the same physical link (the link P1, for example) by relating them together. The line speed is determined in accordance with the greatest of the link traffic volume in the link L1 and the link traffic volume in the link L2. In other words, the power consumption in each link of bi-directional links on the same physical link is determined based on the greatest link traffic volume of the link traffic volumes of the bi-directional link.

The link cost management unit 32 in the network management system 30 also has the similar ALR feature.

In this fourth embodiment, the respective communication adaptors AD provided in the nodes A1, B1, C1, and D1 have the similar power consumption characteristic (ALR characteristic) 1, as depicted in FIG. 22. More specifically, in this fourth embodiment, the origin node power characteristic and the endpoint power characteristic are both ALR characteristic 1 in each link.

The ALR characteristic 1 is such that the power consumption is varied in stepwise with respect to link traffic volume. That is, the link power consumption is 0 W for a link traffic volume of 0 Mbps; the link power consumption is 0.1 W in a traffic volume ranging from 0 Mbps to 10 Mbps; to 0.2 W in a traffic volume ranging from 10 Mbps to 100 Mbps; and to 1.8 W at a traffic volume exceeding 100 Mbps. Hereinafter, the ALR characteristic is sometimes simply referred to as the "characteristic".

FIG. 23 depicts a forth embodiment of a link attribute table that is stored in the storage unit 37 and managed by the state management unit 35 and the link cost management unit 32 in the network management system 30. The link attribute table stores, in the link attribute table, a origin node, a endpoint node, a origin node power characteristic, a endpoint node power characteristic, a current link traffic volume (link traffic volume), and a current link power consumption (link power consumption) for each link.

In this fourth embodiment, the link power consumption is represented by the sum of the power consumption at the origin node and the power consumption at the endpoint node. In other words, the link power consumption represents the link power consumption for each physical link.

in addition, in response to a flow setting request, the link for which the power is to be determined (target link), the link traffic volume upon addition of a new flow, and the link power consumption upon addition of a new flow are estimated by the link cost management unit 32.

In the example depicted in FIG. 23, in the column of link traffic volume (when new flow added), the link traffic volume in the opposing link on the same physical link is listed in parenthesis "( )", and together with the inequality sign indicating which of the values is greater.

As used herein, the "link for which the power is to be determined" is a link having a greater link traffic volume of bi-directional links on the same physical link, upon addition of a new flow. Such a link for which the power is to be determined is determined by the link cost management unit 32, for example.

The "link power consumption upon addition of a new flow" is the power consumption derived from the above-described ALR characteristic 1, based on the link traffic volume upon addition of a new flow of the target link for which the power is to be determined. The link power consumption upon addition of a new flow is also represented by the sum of the power consumption at the origin node upon addition of a new flow and the power consumption at the endpoint node upon addition of a new flow.

In addition, the difference between the link power consumption upon addition of a new flow and the current link power consumption is stored in the link attribute table, as a link cost value, for each link. The allocation of the link cost value is given by an increase in the power consumption when the request flow is accommodated.

If the link power consumption upon addition of a new flow and the current link power consumption are the same, the link cost value is set to a minute value (0.001, for example), for indicating that the power consumption is not changed.

For example, a request flow of 10 Mbps from the node A1 to the node B1 is generated in the example depicted in FIGS. 20 to 23.

An example of calculation of the link cost of the target link L1 will be described first. The link L1 is transferring 25 Mbps, whereas the link L2 is transferring 20 Mbps. In this situation, the respective links L1 and L2 are set to a line speed required for transferring 25 Mbps, which is the link traffic volume in the link L1 having a higher load. In this situation, the current link power consumptions at the origin node A1 and the endpoint node C1 of the link L1 are 0.2 W and 0.2 W, respectively, consuming 0.4 W in total.

When a request flow of 10 Mbps is newly added to the link L1, the link L1 has to transfer 35 Mbps, which is greater than the link traffic volume in the link L2 of 20 Mbps (higher load). As a result, the link L1 and the link L2 maintain the line speed required for transferring the link traffic volume in the link L1 of 35 Mbps.

Accordingly, the origin node A1 and the endpoint node C1 keep consumptions of 0.2 W and 0.2 W, respectively, consuming 0.4 W in total. Thus, there is no increase in power consumption after accommodating the request flow to the link L1, and the link cost value of the link L1 is set to δ (minute value).

An example of calculation of the link cost of the target link L2, which opposes to the link L1, will be described next. The link L1 is transferring 25 Mbps, whereas the link L2 is transferring 20 Mbps. In this situation, the respective links L1 and L2 are set to a line speed required for transferring 25 Mbps, which is the link traffic volume in the link L1 having a higher load. In this situation, the current link power consumptions at the origin node C1 and the endpoint node A1 of the link L2 are 0.2 W and 0.2 W, respectively, consuming 0.4 W in total.

When a request flow of 10 Mbps is newly added to the link L2, the link L2 has to transfer 30 Mbps, which is greater than the link traffic volume in the link L1 of 25 Mbps. As a result, the link L1 and the link L2 maintain the line speed required for transferring the link traffic volume in the link L2 of 30 Mbps.

Accordingly, the origin node C1 and the endpoint node A1 keep consumptions of 0.2 W and 0.2 W, respectively, consuming 0.4 W in total. Thus, there is no increase in power consumption after accommodating the request flow to the link L1, and the link cost value of the link L2 is also set to δ (minute value).

Similarly, an example of calculation of the link cost of the target link L3 will be described. The link L3 is transferring 95 Mbps, whereas the link L4 is transferring 30 Mbps. In this situation, the respective links L3 and L4 are set to a line speed required for transferring 95 Mbps, which is the link traffic volume in the link L3 having a higher load. In this situation, the current link power consumptions at the origin node C1 and the endpoint node B1 of the link L3 are 0.2 W and 0.2 W, respectively, consuming 0.4 W in total.

When a request flow of 10 Mbps is newly added to the link L3, the link L3 has to transfer 105 Mbps, which is greater than the link traffic volume in the link L1 of 30 Mbps. As a result, the line speeds of the link L3 and the link L4 are changed to the line speeds required for transferring the link traffic volume of 105 Mbps at the link L3 having higher load.

Accordingly, the power consumptions at origin node C1 and the endpoint node B1 are 1.8 W and 1.8 W, respectively, increasing 3.6 W in total. Thus, the link cost value of the link L3 is set to 3.6−0.4=3.2.

An example of calculation of the link cost of the target link L4, which opposes to the link L3, will be described next. The link L3 is transferring 95 Mbps, whereas the link L4 is transferring 30 Mbps. In this situation, the respective links L3 and L4 are set to a line speed required for transferring 95 Mbps, which is the link traffic volume in the link L3 having a higher load. In this situation, the current link power consumptions at the origin node B1 and the endpoint node C1 of the link L4 are 0.2 W and 0.2 W, respectively, consuming 0.4 W in total.

When a request flow of 10 Mbps is newly added to the link L4, the link L4 has to transfer 40 Mbps, which is smaller than the link traffic volume in the link L3 of 95 Mbps (lower load). As a result, the link L3 and the link L4 maintain the line speed required for transferring the link traffic volume in the link L3 of 95 Mbps. In this situation, the current link power consumptions at the origin node B1 and the endpoint node C1 of the link L4 are 0.2 W and 0.2 W, respectively, consuming 0.4 W in total, and the link cost value at the link L4 is set to δ (minute value).

The link cost values for the links L5 to L8 are determined in the similar manner.

The route calculation unit 31 determines, as the route for request flow, the route of the route of the nodes A1, D1, and B1 having the smallest sum of link costs from the node to the node B1, based link cost values calculated as described above, as indicated by Arrow F in FIG. 24.

As described above, in the fourth embodiment, the link power consumption is determined based on the link having a greater link traffic volume of two bi-directional links related to a single physical link, thereby determining the link cost.

Accordingly, the link cost in accordance with the loads of link traffic on the physical link can be calculated.

Variant of Fourth Embodiment

Although the fourth embodiment gas been described using the example in which the origin node and the endpoint node both have the ALR characteristic 1 in each link, this is not limiting. This variant of the fourth embodiment will be described with reference to an example in which the origin node and the endpoint node have different ALR characteristics in each link.

In the variant of the fourth embodiment, a network constituted by a node A1, a node B1, a node C1 and a node D1 is also assumed, as depicted in FIG. 20, for example.

In this variant of the fourth embodiment, communication adaptors AD of nodes C1 and D1 has an ALR characteristic 1, while communication adaptors AD of nodes A1 and B1 has an ALR characteristic 2. In other words, in the links connecting between the nodes A1, B1, C1, and D1, the origin node and the endpoint node have the different link power consumption characteristics.

Figure 25:
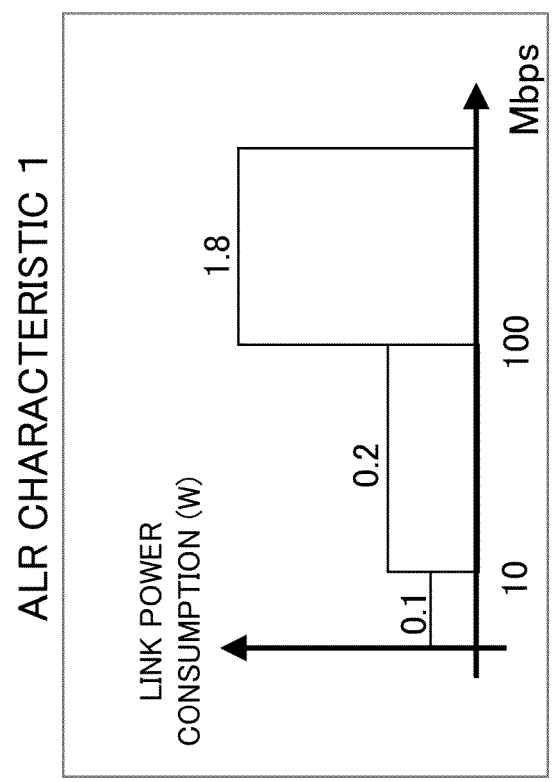
FIG. 25 is a diagram exemplifying an ALR characteristic 1.
Figure 26:
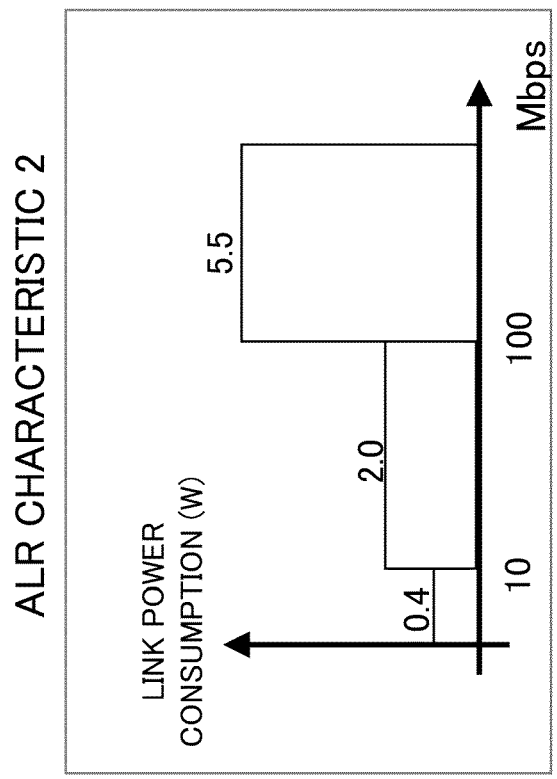
FIG. 26 is a diagram exemplifying an ALR characteristic 2.
Figure 28:
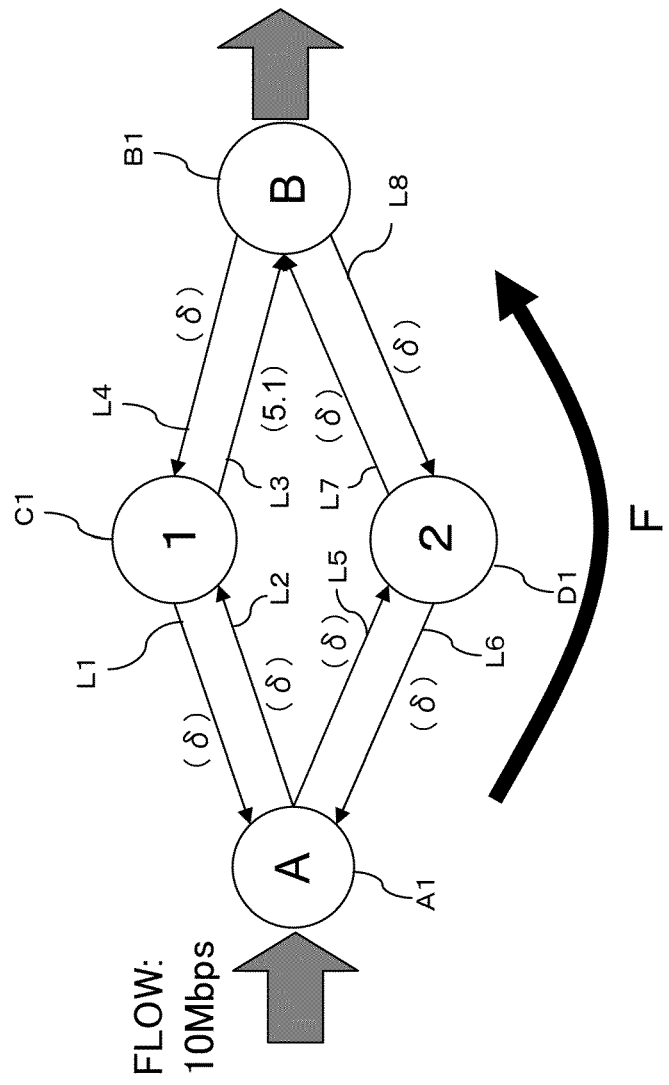
FIG. 28 is a diagram illustrating a route that is determined.

FIG. 25 is a diagram exemplifying the ALR characteristic 1 in the variant of the fourth embodiment; FIG. 26 is a diagram exemplifying the ALR characteristic 2; FIG. 27 is a diagram illustrating the link attribute table in the variant of the fourth embodiment; and FIG. 28 is a diagram illustrating a route that is determined.

In the ALR characteristics 1 and 2, the link power consumption is a discrete value, and is varied stepwise in accordance with the greater link traffic volume of the bi-directional link. In the ALR characteristic 1, as depicted in FIG. 25, the link power consumption is 0 W for a link traffic volume of 0 Mbps; the link power consumption is 0.1 W in a traffic volume ranging from 0 Mbps to 10 Mbps; to 0.2 W in a traffic volume ranging from 10 Mbps to 100 Mbps; and to 1.8 W at a traffic volume exceeding 100 Mbps.

In the ALR characteristic 2, as depicted in FIG. 26, the link power consumption is 0 W for a link traffic volume of 0 Mbps; the link power consumption is 0.4 W in a traffic volume ranging from 0 Mbps to 10 Mbps; to 2.0 W in a traffic volume ranging from 10 Mbps to 100 Mbps; and to 5.5 W at a traffic volume exceeding 100 Mbps.

FIG. 27 depicts variant of the forth embodiment of a link attribute table that is stored in the storage unit 37 and managed by the state management unit 35 and the link cost management unit 32 in the network management system 30. The link attribute table depicted in FIG. 27 stores the ALR characteristic corresponding to the origin node or the endpoint node for each link, as a origin node power characteristic and a endpoint node power characteristic.

In this variant of the fourth embodiment, the link power consumption upon addition of a new flow is the power consumption derived from the ALR characteristics 1 and 2 depicted in FIGS. 25 and 26, based on the link traffic volume of the link for which the power is to be determined upon addition of a new flow.

The values other than these differences in the link attribute table depicted in FIG. 27 are similar to or substantially similar to the link attribute table depicted in FIG. 23, and their detailed description will be omitted.

Here, for example, a request flow of 10 Mbps from the node A1 to the node B1 is generated in the example depicted in FIGS. 25 to 27.

An example of calculation of the link cost of the target link L1 will be described. The link L1 is transferring 25 Mbps, whereas the link L2 is transferring 20 Mbps. In this situation, the respective links L1 and L2 are set to a line speed required for transferring 25 Mbps, which is the link traffic volume in the link L1 having a higher load. In this situation, the current link power consumptions at the origin node A1 and the endpoint node C1 of the link L1 are 2.0 W and 0.2 W, in accordance with the ALR characteristic 2 and the ALR characteristic 1, respectively, consuming 2.2 W in total.

When a request flow of 10 Mbps is newly added to the link L1, the link L1 has to transfer 35 Mbps, which is greater than the link traffic volume in the link L2 of 20 Mbps. As a result, the link L1 and the link L2 maintain the line speed required for transferring the link traffic volume in the link L1 of 35 Mbps.

Accordingly, the origin node A1 and the endpoint node C1 keep consumptions of 2.0 W and 0.2 W, respectively, consuming 2.2 W in total. Thus, there is no increase in power consumption after accommodating the request flow to the link L1, and the link cost value of the link L1 is set to δ (minute value).

An example of calculation of the link cost of the target link L2, which opposes to the link L1, will be described next. The link L1 is transferring 25 Mbps, whereas the link L2 is transferring 20 Mbps. In this situation, the respective links L1 and L2 are set to a line speed required for transferring 25 Mbps, which is the link traffic volume in the link L1 having a higher load. In this situation, the current link power consumptions at the origin node C1 and the endpoint node A1 of the link L2 are 0.2 W and 2.0 W, in accordance with the ALR characteristic 1 and the ALR characteristic 2, respectively, consuming 2.2 W in total.

When a request flow of 10 Mbps is newly added to the link L2, the link L2 has to transfer 30 Mbps, which is greater than the link traffic volume in the link L1 of 25 Mbps. As a result, the link L1 and the link L2 maintain the line speed required for transferring the link traffic volume in the link L2 of 30 Mbps.

Accordingly, the origin node C1 and the endpoint node A1 keep consumptions of 0.2 W and 2.0 W, respectively, consuming 2.2 W in total. Thus, there is no increase in power consumption after accommodating the request flow to the link L1, and the link cost value of the link L2 is also set to δ (minute value).

Similarly, an example of calculation of the link cost of the target link L3 will be described. The link L3 is transferring 95 Mbps, whereas the link L4 is transferring 30 Mbps. In this situation, the respective links L3 and L4 are set to a line speed required for transferring 95 Mbps, which is the link traffic volume in the link L3 having a higher load. In this situation, the current link power consumptions at the origin node C1 and the endpoint node B1 of the link L3 are 0.2 W and 2.0 W, in accordance with the ALR characteristic 1 and the ALR characteristic 2, respectively, consuming 2.2 W in total.

When a request flow of 10 Mbps is newly added to the link L3, the link L3 has to transfer 105 Mbps. As a result, the line speeds of the link L1 and the link L2 are changed to the line speeds required for transferring the link traffic volume of 105 Mbps at the link L3 having higher load.

Accordingly, the power consumptions at origin node C1 and the endpoint node B1 are 1.8 W and 5.5 W, respectively, consuming 7.3 W in total. Thus, the link cost value of the link L3 is set to 7.3−2.2=5.1.

An example of calculation of the link cost of the target link L4, which opposes to the link L3, will be described next. The link L3 is transferring 95 Mbps, whereas the link L4 is transferring 30 Mbps. In this situation, the respective links L3 and L4 are set to a line speed required for transferring 95 Mbps, which is the link traffic volume in the link L3 having a higher load. In this situation, the current link power consumptions at the origin node B1 and the endpoint node C1 of the link L4 are 2.0 W and 0.2 W, in accordance with the ALR characteristic 2 and the ALR characteristic 1, respectively, consuming 2.2 W in total.

When a request flow of 10 Mbps is newly added to the link L4, the link L4 has to transfer 40 Mbps, which is smaller load than the link traffic volume in the link L3 of 95 Mbps. As a result, the line speeds of the link L3 and the link L4 are changed the line speeds required for transferring the link traffic volume of 95 Mbps at the link L3 having higher load. In this case, the power consumptions at origin node B1 and the endpoint node C1 of the link L4 are 2.0 W and 0.2 W, respectively, consuming 2.2 W in total. In other words, there is no increase in power consumption after accommodating the request flow to the link L4, and the link cost value of the link L4 is set to δ (minute value).

The link cost values for the links L5 to L8 are determined in the similar manner.

The route calculation unit 31 determines, as the route for request flow, the route of the nodes A1, D1, and B1 having the smallest sum of link costs from the node A1 to the node B1, based link cost values calculated as described above, as indicated by Arrow F in FIG. 28.

As described above, this variant of the fourth embodiment can be applied to cases in which the origin node and the endpoint node include communication adaptors AD having different ALR characteristics for each link. Accordingly, the variant can be used for a wide variety of situations, which is convenient.

Although the relationships exemplified in FIGS. 25 and 26 are stored as link power consumption characteristics of the origin node and the endpoint node in this variant of the fourth embodiment, these ALR characteristics are not limiting. For example, ALR characteristics other than those exemplified in FIGS. 25 and 26 may be used, or a different link power consumption characteristic may be provided for a part of links, or different link power consumption characteristics may be used for each of the links.

Fifth Embodiment

In the embodiments and the variant described above, the route that has the smallest sum of link cost values is determined as a route for a request flow determine. In these techniques, there may be multiple routes (candidate routes) having the same smallest sum of link cost values when calculating the sums of link cost values. Hereinafter, when multiple routes have the same smallest sum of link cost values, that cost is referred as the "equal cost".

Figure 29:
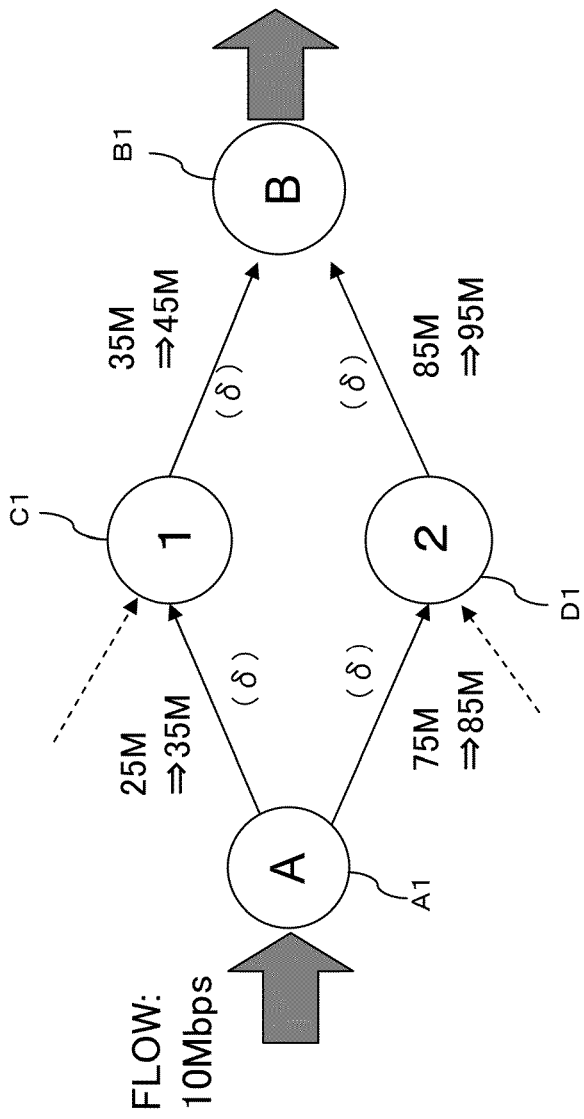
FIG. 29 is a diagram exemplifying the structure of a network.
Figure 30:
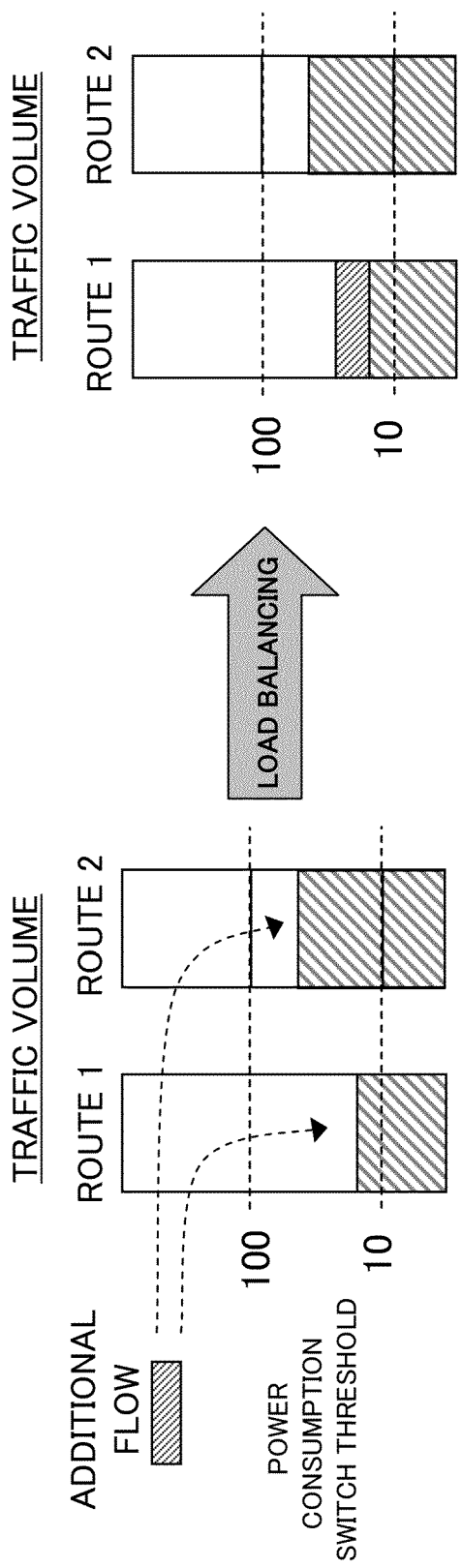
FIGS. 30A and 30B are diagrams illustrating a conventional route selection technique.
Figure 31:
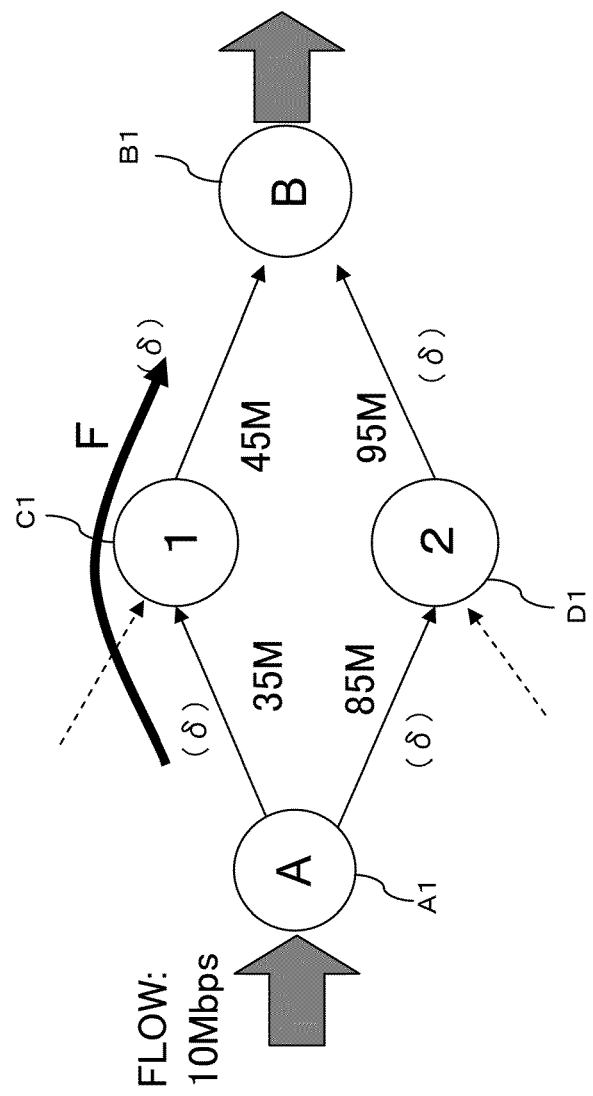
FIG. 31 is a diagram exemplifying a route that is determined.

FIG. 29 is a diagram exemplifying the structure of the network; FIGS. 30A and 30B are diagrams illustrating a conventional route selection technique; and FIG. 31 is a diagram exemplifying a route that is determined.

The example depicted in FIG. 29 depicts a network in which an equal cost is obtained when a request flow (additional flow) of 10 Mbps is newly added.

In conventional techniques, when there are multiple route having an equal cost, the routes having the lowest load is generally selected from the route candidates having the equal cost such that the load of traffic volumes is equalized. For example, there are a route 1 and a route 2 as depicted in FIG. 30A, the route having the lower load, i.e., the route 1 having the lower traffic volume is selected, as depicted in FIG. 31. As a result, an additional flow is added to the route 1, as depicted in FIG. 30B.

However, in the example depicted in FIG. 30A, the current link traffic volume of the route 1 is slightly higher than the threshold value (10 Mbps) for switching the link power consumption. Accordingly, it is highly possible that the power consumption operation level (power-saving operating level) is transitioned to the next lower level when the flow is released and thus the traffic is reduced, and the link power consumption is reduced.

In other word, in conventional techniques in which the route having the lower load is selected at the time when an equal cost is obtained and a request flow is add to that route, it is possible that the selection of the route may rather diminish the possible power consumption reduction, because the possible power consumption reduction achievable by the power-saving feature of each node is not taken into consideration. Accordingly, it is desirable to select the optimal route from multiple candidate routes if there are multiple candidate routes having an equal cost.

This fifth embodiment selects a route from candidate routes having an equal cost by taking the possible power reduction caused by traffic reduction. More specifically, a "power reduction index value" indicating the possible power reduction is derived for each of routes having an equal cost, and a route is selected based on the power reduction index values, thereby accommodate a request flow such that the possible power consumption reduction caused by traffic reduction is maintained.

This fifth embodiment will also be described with reference to an example in which the origin node and the endpoint node have different ALR characteristics for each link, similar to the variant of the fourth embodiment as set forth previously.

More particularly, in a link connecting nodes, the origin node and the endpoint node have different link power consumption characteristics.

Figure 32:
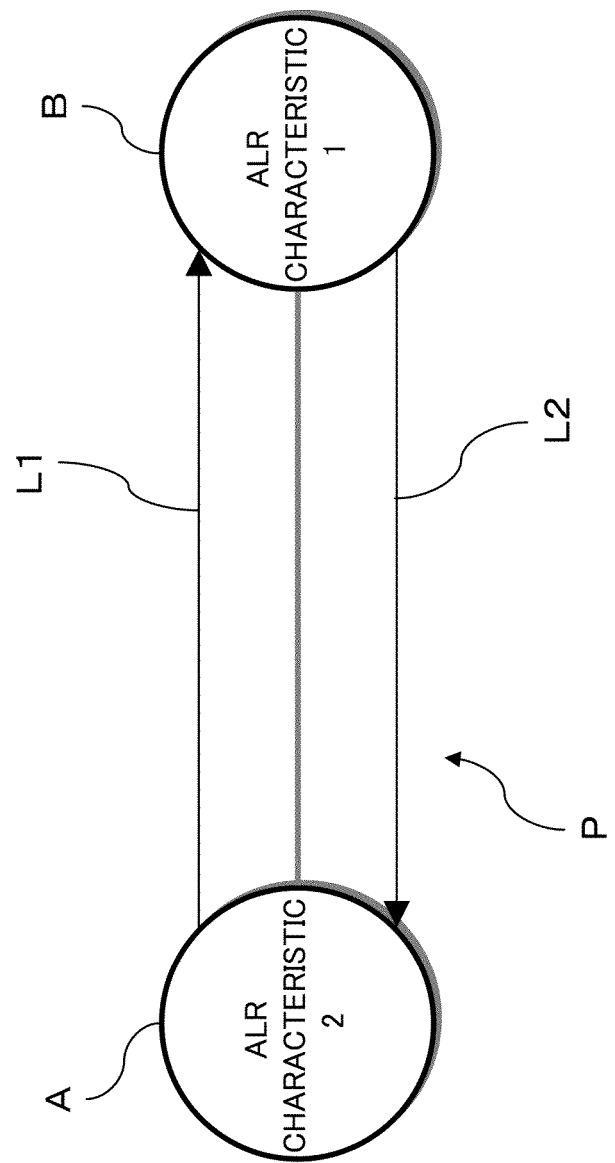
FIG. 32 is a diagram illustrating the structure of a link.
Figure 33A:
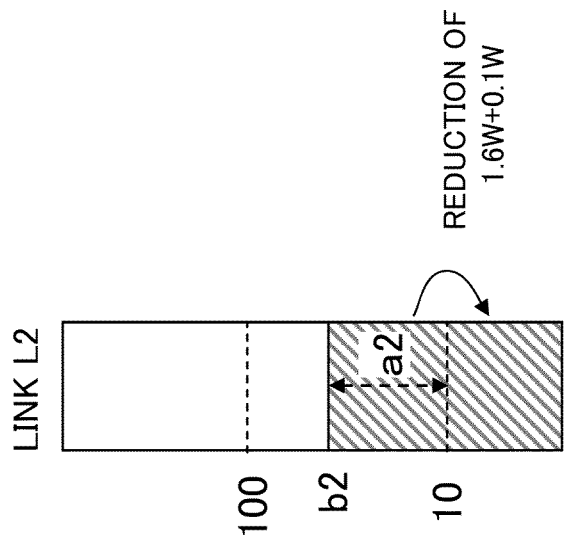
FIGS. 33A and 33B are diagrams illustrating a fifth embodiment of a technique to calculate a power reduction index value for each link.
Figure 33B:
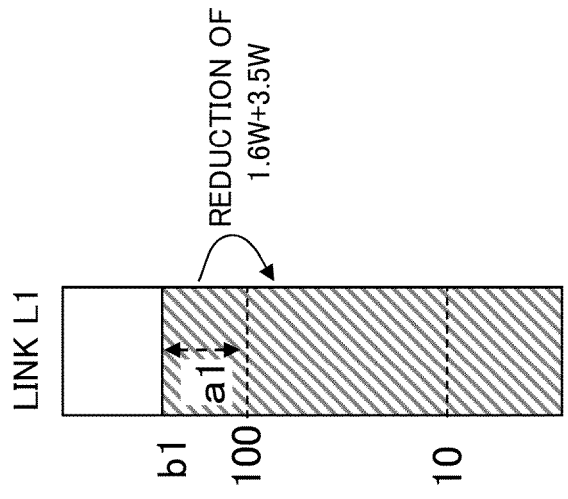

FIG. 32 is a diagram illustrating the structure of a link; and FIGS. 33A and 33B are diagrams illustrating a technique to calculate a power reduction index value for each link in the fifth embodiment.

As depicted in FIG. 32, an example will be described in which nodes A and B coupled with each other through a physical link P, and bi-directional links (a link L1 and a link L2) are managed for the physical link P.

In this example, the communication adaptor AD of the node A, which is the flow origin of the link L1 while the endpoint of the link L2 has an ALR characteristic 2. Additionally, the communication adaptor AD of the node B, which is the endpoint of the link L1 and the flow origin of the link L2 has an ALR characteristic 1.

Also in this fifth embodiment, the ALR characteristic 1 has the relationship between the link traffic volume and the link power consumption exemplified in FIG. 25, and the ALR characteristic 2 has the relationship between the link traffic volume and the link power consumption exemplified in FIG. 26.

More specifically, in the ALR characteristics 1 and 2, the link power consumption is a discrete value, and is varied stepwise in accordance with the greater link traffic volume of the bi-directional link. Hereinafter, the threshold traffic volume at which the link power consumption (power consumption operation level) is varied in the ALR characteristics is referred to as the "rate threshold value".

In the ALR characteristic 1, as depicted in FIG. 25, the link power consumption is 0 W for a link traffic volume of 0 Mbps; the link power consumption is 0.1 W in a traffic volume ranging from 0 Mbps to 10 Mbps; to 0.2 W in a traffic volume ranging from 10 Mbps to 100 Mbps; and to 1.8 W at a traffic volume exceeding 100 Mbps.

In the ALR characteristic 2, as depicted in FIG. 26, the link power consumption is 0 W for a link traffic volume of 0 Mbps; the link power consumption is 0.4 W in a traffic volume ranging from 0 Mbps to 10 Mbps; to 2.0 W in a traffic volume ranging from 10 Mbps to 100 Mbps; and to 5.5 W at a traffic volume exceeding 100 Mbps.

In other words, in the ALR characteristics 1 and 2, 10 Mbps and 100 Mbps are rate threshold values at which the power consumption operation level is varied.

Hereinafter, the difference between rate threshold values in the ALR characteristics may be referred to as a "traffic level". For example, the ALR characteristic 1 depicted in FIG. 25 has three traffic levels: link traffic volumes from 0 Mbps to 10 Mbps; link traffic volumes from 10 Mbps to 100 Mbps; and link traffic volumes above 100 Mbps.

In other words, the link traffic volumes from 0 Mbps to 10 Mbps are on the same traffic level, and correspond to a power consumption operation level of 0.1 W. Similarly, the link traffic volumes from 10 Mbps to 100 Mbps are on the same traffic level, and correspond to a power consumption operation level of 0.2 W. Furthermore, the link traffic volumes above 100 Mbps are on the same traffic level, and correspond to a power consumption operation level of 1.8 W.

In the example depicted in FIG. 25, by reducing the traffic level by one level, it is possible to reduce power consumption operation level, thereby reducing the power consumption by one level.

As used therein, the "power reduction index value" is the index value obtained by averaging the power reduction effect by reduction of the link traffic volume by 1 bps.

More specifically, the power consumption reduction index value S in a link is obtained by the following Equation (1):

Power consumption reduction index value $S$=(power consumption reduction of the endpoint node $Ed$+power consumption reduction of the origin node $Es$)/difference "$a$" between the current traffic volume and the rate threshold value that can reduce the power consumption by one level (1)

As used herein, the "difference between the current traffic volume and the rate threshold value that can reduce the power consumption by one level '$a$'" is the difference from boundary traffic volume (rate threshold value) at which the power consumption operation level is switched to the level one level lower than the power consumption corresponding to the current traffic volume and the current traffic volume in the ALR characteristic.

In other words, the "rate threshold value that can reduce the power consumption by one level" is the rate threshold value that is lower than current traffic volume and the closer to the current traffic volume. The rate threshold value that can reduce the power consumption by one level can be regarded as the rate threshold value that is the threshold value from the next-lower traffic level.

Hereinafter, the difference between the current traffic volume and the rate threshold value that can reduce the power consumption by one level for the link L1 will be referenced by the symbol "a1", by appending the symbol "1" representing the link L1 to the symbol "a" representing the difference between the current traffic volume and the rate threshold value that can reduce the power consumption by one level.

Similarly, the difference between the current traffic volume and the rate threshold value that can reduce the power consumption by one level for the link L2 will be referenced by the symbol "a2", by appending the symbol "2" representing the link L2 to the symbol "a".

The "power consumption reduction of the endpoint node Ed" represents the difference, in a endpoint node, between the link power consumption corresponding to the current traffic volume and the link power consumption when the traffic volume is reduced to be lower than the rate threshold value, and the power consumption (power consumption operation level) is reduced by one level.

The "power consumption reduction of the origin node Es" represents the difference, in a origin node, between the link power consumption corresponding to the current traffic volume and the link power consumption when the traffic volume is reduced to be lower than the rate threshold value, and the power consumption (power consumption operation level) is reduced by one level.

Here, a technique to calculate a power reduction index value for the link L1 will be described with reference to the example depicted in FIG. 32 and FIG. 33A.

For example, when the current traffic volume b1 of the link L1 is greater than 100 Mbps (b1>100 Mbps), the rate threshold value that can reduce the power consumption by one level is 100 Mbps.

In other words, the difference "a1" between the current traffic volume and the rate threshold value that can reduce the power consumption by one level is (b1−100 Mbps).

For the endpoint node B of the link L1 (ALR characteristic 1), the difference (1.8 W−0.2 W=1.6 W) between the link power consumption (1.8 W) corresponding to the current traffic volume b1 of the link L1 and the link power consumption (0.2 W) when the traffic volume is reduced to be lower than the rate threshold value (100 Mbps), and the link power consumption is reduced by one level is the power consumption reduction Ed of the endpoint node B in the link L1.

The value of the power consumption reduction Ed indicates that it is possible that the power consumption at the endpoint node B is reduced by 1.6 W from 1.8 W to 0.2 W if the traffic volume is reduced by a1 (=b1−100) bps for the traffic state of the link L1.

Subsequently, for the origin node A of the link L1 (ALR characteristic 2), the difference (5.5 W−2.0 W=3.5 W) between the link power consumption (5.5 W) corresponding to the current traffic volume b1 of the link L1 and the link power consumption (2.0 W) when the traffic volume is reduced to be lower than the rate threshold value (100 Mbps), and the link power consumption is reduced by one level is the power consumption reduction Es of the origin node A in the link L1.

This indicate that it is possible that the power consumption at the origin node A is reduced by 3.5 W from 5.5 W to 2.0 W if the link traffic volume is reduced by a1 (=b1−100 M) bps for the traffic state of the link L1.

Accordingly, the power consumption reduction index value S of the link L1 can be obtained as follows from the above-described Equation (1):

Power consumption reduction index value $S$ of link $L1=(1.6\ W+3.5\ W)/a1=5.1\ W/a1$ The power consumption reduction index value S of the link L1=5.1 W/a1 can be interpreted that the power consumption reduction of 5.1 W in total at the origin node and the endpoint node can be possible for a traffic volume reduction of a1 bps in the link L1.

Next, a technique to calculate a power reduction index value for the link L2 will be described with reference to the example depicted in FIG. 32 and FIG. 33B.

For example, the current traffic volume b2 of the link L2 is greater than 10 Mbps and equal to or smaller than 100 Mbps (10 Mbps≥b2>100 Mbps), the rate threshold value that can reduce the power consumption corresponding to the current traffic volume by one level is 10 Mbps.

In other words, the difference "a2" between the current traffic volume and the rate threshold value that can reduce the power consumption by one level is (b2−10 Mbps).

For the endpoint node A of the link L2 (ALR characteristic 2), the difference (2.0 W−0.4 W=1.6 W) between the link power consumption (2.0 W) corresponding to the current traffic volume b2 of the link L2 and the link power consumption (0.4 W) when the traffic volume is reduced to be lower than the rate threshold value (10 Mbps), and the link power consumption is reduced by one level is the power consumption reduction Ed (1.6 W) of the endpoint node B in the link L2.

This indicate that it is possible that the power consumption at the endpoint node A is reduced by 1.6 W from 2.0 W to 0.4 W if the link traffic volume is reduced by a2 (=b2−10 M) bps for the traffic state of the link L2.

Subsequently, for the origin node A of the link L2 (ALR characteristic 1), the difference (0.2 W−0.1 W=0.1 W) between the link power consumption (0.2 W corresponding to the current traffic volume b2 of the link L2) and the link power consumption (0.1 W) when the traffic volume is reduced to be lower than the rate threshold value (10 Mbps), and the link power consumption is reduced by one level is the power consumption reduction Es (0.1 W) of the origin node A in the link L2.

This indicate that it is possible that the power consumption at the origin node A is reduced by 0.1 W from 0.2 W to 0.1 W if the link traffic volume is reduced by a2 (=b2−10) bps for the traffic state of the link L2.

Accordingly, the power consumption reduction index value S of the link L2 can be obtained as follows from the above-described Equation (1):

Power consumption reduction index value $S$ of link $L2=(1.6\ W+0.1\ W)/a2=1.7\ W/a2$ The power consumption reduction index value S of the link L2=1.7 W/a2 can be interpreted that the power consumption reduction of 1.7 W in total at the origin node and the endpoint node can be possible for a traffic volume reduction of a2 bps in the link L2.

As described above, the route calculation unit 31 calculates the power reduction index value for each link, calculates the respective sum of power reduction index values for each member link in each of multiple of routes (candidate routes) having an equal cost, and selects a candidate route that has the smallest sum of the power reduction index values as a route for a request flow.

Figure 34:
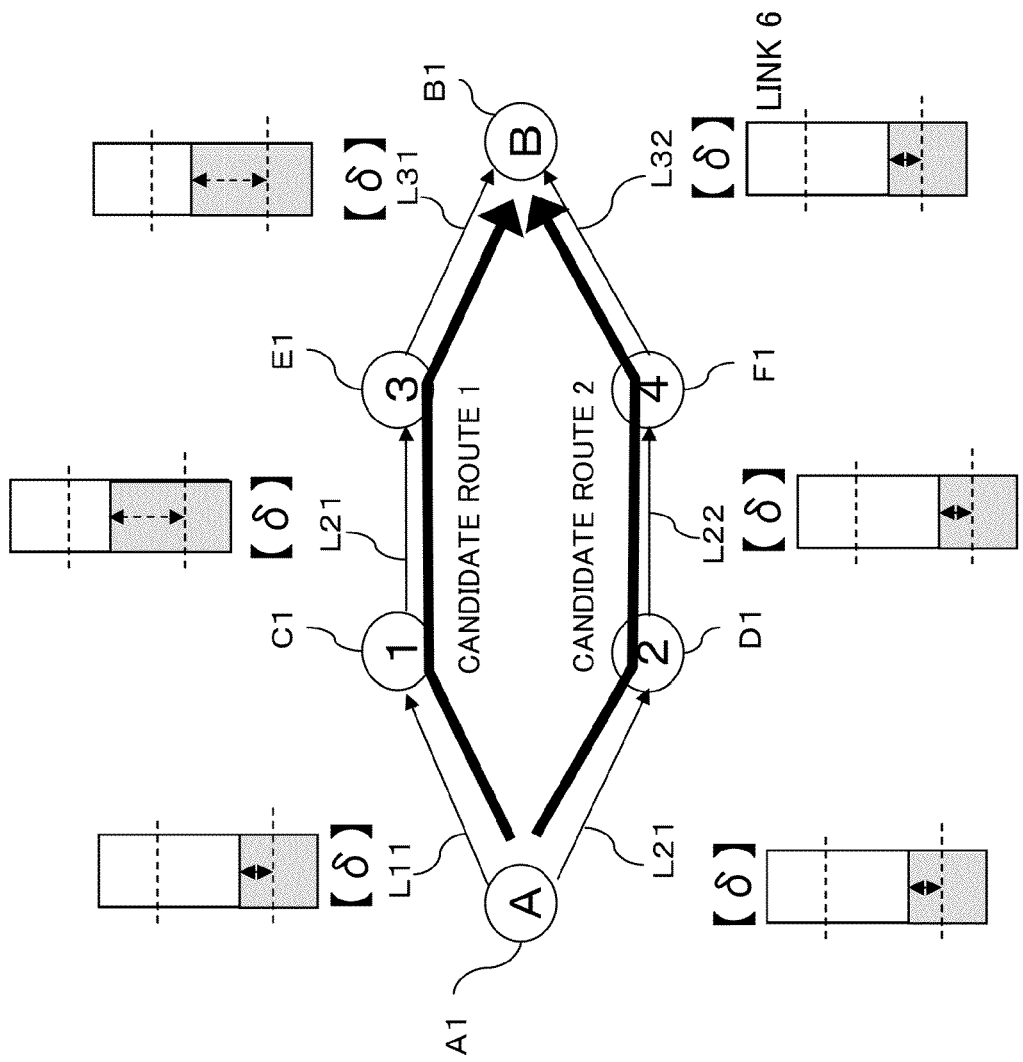
FIG. 34 is a diagram illustrating a fifth embodiment of a route selection method.

FIG. 34 is a diagram illustrating a route selection method in the fifth embodiment. In the example depicted in FIG. 34, two candidate of the routes 1 and 2 having an equal cost are depicted in the route from a start node A1 to an end the node B1.

The candidate route 1 is the route connecting a node A1, a node C1, a node E1, and a node B1, and includes links L11, L21, and L31. In contrast, the candidate route 2 is the route connecting a node A1, a node D1, a node F1, and a node B1, and includes links L21, L22, and L32.

For the candidate routes 1 and 2, the route calculation unit 31 determines the respective power reduction index values of the candidate routes 1 and 2, using the following Equation:

Power reduction index value of candidate route 1=power reduction index value of link $L11$+ power reduction index value of link $L21$+power reduction index value of link $L31$ Power reduction index value of candidate route 2=power reduction index value of link $L12$+ power reduction index value of link $L22$+power reduction index value of link $L32$ In other words, the power reduction index value of each candidate route is determined as the sum of the power reduction index values of the links forming the candidate route.

For the multiple candidate routes 1 and 2 having an equal cost, the route calculation unit 31 then selects (determines), as a route for a request flow, a candidate route that has the smallest sum of the power reduction index values, based on the calculated power reduction index values of the candidate routes 1 and 2.

FIG. 35 is a flowchart of a fifth embodiment of network route calculation processing executed by the route calculation unit 31 in the network management system 30.

The route calculation unit 31 gives a link cost to each link connecting nodes, for all of the routes from the start node (source node) to the end node (destination node) specified in a flow setting request, using the technique in any of the embodiments and the variant described above (Step S51). The route calculation unit 31 then identifies the route that has the smallest sum of link cost values from all of the routes from the start node (source node) to the end node (destination node).

In addition, the route calculation unit 31 checks whether there are multiple routes having an equal cost (Step S52). if there are not multiple routes having an equal cost (see NO route in Step S52), the route that has the smallest sum of link cost values is determined as a route for the request flow determine (Step S56) and the processing is terminated.

If there are multiple routes having an equal cost (see YES route in Step S52), the route calculation unit 31 calculates, for each of the routes (candidate routes) having the equal cost, the respective power reduction index values of the links constructing that route (Step S53). The route calculation unit 31 then calculates, for each of the candidate routes, the sum of the power reduction index values of each member link for each candidate route (Step S54) and selects the candidate route that has the smallest sum of the power reduction index values as a route for the request flow (Step S55), after which the processing is terminated.

As described above, in the fifth embodiment, even if there are candidate routes having an equal cost, route selection having greater power-saving effect, taking the power reduction trend into consideration, can be achieved. In other words, a transfer route for a request flow can be determined such that the possibility of power consumption is probably obtained when the traffic volume is reduced. This can reduce any increase in the power consumption across the entire network, enabling effective operation of the network, from the viewpoint of power consumption.

Sixth Embodiment

Although a power reduction index value is calculated for each link in the fifth embodiment described above, this is not limiting. In actual operation of a system, the variation in the bi-directional traffic volumes determines the link rate and the power consumption.

In this sixth embodiment, power reduction index values are calculated, by taking bi-directional link traffic volumes in the same physical link into consideration.

Also in this sixth embodiment, an example will be described in which nodes A and B coupled with each other through a physical link P, and bi-directional links (a link L1 and a link L2) are managed for the physical link P, similar to the fifth embodiment.

This sixth embodiment will also be described with reference to an example in which one node and the other node of a physical link P have different ALR characteristics. More specifically, as depicted in FIG. 32, one node A of the physical link P has a ALR characteristic 2 while the other node B has an ALR characteristic 1.

Also in this sixth embodiment, the ALR characteristic 1 has the relationship between the link traffic volume and the link power consumption exemplified in FIG. 25, and the ALR characteristic 2 has the relationship between the link traffic volume and the link power consumption exemplified in FIG. 26.

In other words, in this sixth embodiment, both the ALR characteristic 1 and the ALR characteristic 2 have the same rate threshold values (10 Mbps and 100 Mbps), as depicted in FIGS. 25 and 26.

(a) Case in which Link Traffic Volumes of Bi-Directional Links are on the Same Traffic Level The case in which the link traffic volume in the link L1 and the link traffic volume in the link L2 are on the same traffic level will be described first. When traffic volumes of the bi-directional links are on the same traffic level, the traffic levels of both the links L1 and L2 should be reduced in order to reduce the power consumption at the physical link. In other words, the power consumption operation levels of both the links L1 and L2 should be reduced.

In this sixth embodiment, when the link traffic volumes of the bi-directional links are on the same traffic level, the power consumption reduction index value S at the physical link P is determined using the following Equation (2):

$S$=(Power consumption reduction $E1$ at one node+ power consumption reduction $E2$ at the other node)/(the difference "$a1$" between the current traffic volume and the rate threshold value that can reduce the power consumption by one level at the link $L1$+the difference "$a2$" between the current traffic volume and the rate threshold value that can reduce the power consumption by one level at the link $L2$) (2)

Here, a technique to calculate a power reduction index values for the links L1 and L2 will be described with reference to the example depicted in FIG. 32 and FIGS. 36A and 36B. FIGS. 36A and 36B are diagrams illustrating a technique to calculate a power reduction index value for each link when the bi-directional links are on the same traffic level in the sixth embodiment.

For example, let's assume that the current traffic volume b1 of the link L1 and the current traffic volume b2 of the link L2 are both greater than 10 Mbps and equal to or smaller than 100 Mbps (100 Mbps≥b1>10 Mbps, and 100 Mbps≥b2>10 Mbps). The rate threshold value that can reduce the current traffic volume and the power consumption by one level is 10 Mbps.

The power reduction index value S of the physical link P is the index value obtained by averaging the power reduction effect by reduction of the link traffic volume by 1 bps. In this sixth embodiment, the proportion of the power consumption with respect to how much traffic volume is reduced for the physical link P is important. Accordingly, the sum of the traffic volume reduction a1 required for reducing the traffic level by one level in the link L1 and the traffic volume reduction a2 required for reducing the traffic level by one level in the link L2 is used in the denominator.

For the endpoint node B of the link L1 (ALR characteristic 1), the difference (0.2 W−0.1 W=0.1 W) between the link power consumption (0.2 W) of the node B corresponding to the current traffic volume b1 and the link power consumption (0.1 W) when the traffic volume is reduced to be lower than the rate threshold value (10 Mbps), and the power consumption operation level is reduced by one level is the power consumption reduction Ed (Ed=0.1 W) at the one side of node B.

Similarly, for the origin node A of the link L1 (ALR characteristic 2), the difference (2.0 W−0.4 W=1.6 W) between the link power consumption (2.0 W) of the node A corresponding to the current traffic volume b1 and the link power consumption (0.4 W) when the traffic volume is reduced to be lower than the rate threshold value (10 Mbps), and the power consumption operation level is reduced by one level is the power consumption reduction Es (Es=1.6 W) at the side of the origin node A.

In other words, in the link L1, the traffic is reduced smaller than the rate threshold value of 10 Mbps and the power consumption at the endpoint node B is reduced by 1.6 W from 2.0 W to 0.4 W if the traffic volume is reduced by a1 bps. Similarly, the power consumption at the origin node A is reduced by 0.1 W from 0.2 W to 0.1 W. This means that it is possible that the power consumption is reduced by 1.7 W in total.

For the endpoint node A of the link L2 (ALR characteristic 2), the difference (2.0 W−0.4 W=1.6 W) between the link power consumption (2.0 W) of the node A corresponding to the current traffic volume b2 and the link power consumption (0.4 W) when the traffic volume is reduced to be lower than the rate threshold value (10 Mbps), and the power consumption operation level is reduced by one level is the power consumption reduction Ed (Ed=0.1 W) at the side of the endpoint node A.

Similarly, for the origin node B of the link L2 (ALR characteristic 1), the difference (0.2 W−0.1 W=0.1 W) between the link power consumption (0.2 W) of the node B corresponding to the current traffic volume b2 and the link power consumption (0.1 W) when the traffic volume is reduced to be lower than the rate threshold value (10 Mbps), and the power consumption operation level is reduced by one level is the power consumption reduction Es (Es=0.1 W) at the side of the origin node B.

In other words, in the link L2, the traffic cannot be reduced smaller than the rate threshold value of 10 Mbps as the physical link P unless the traffic volume is reduced by b2 bps. Accordingly, in order to reduce the power consumption by 1.7 W (0.1 W+1.6 W) in the physical link P, the link traffic volume in the link L2 should be reduced by a2 bps.

Accordingly, for the corresponding physical link P, it can be interpreted that the power can be reduced by 1.7 W if the link traffic volume is reduced by (a1+a2) bps. The power reduction index values S of the link L1 and the link L2 (the physical link P) in this case can be determined as follows using the above-described Equation (2):

Power consumption reduction index value S of physical link $P=(0.1\,W+1.6\,W)/(a1+a2)=1.7\,W/(a1+a2)$ The power consumption reduction index value S of the link $L2=1.7\,W/(a1+a2)$ can be interpreted that the power consumption of totaling 1.7 W can be reduced at nodes across the physical link by reducing the traffic volume by a1 bps in the link L1 and reducing the traffic volume by a2 bps in the link L2.

As described above, the route calculation unit 31 calculates the power reduction index value for each link, calculates the respective sum of power reduction index values for each member link in each of multiple of routes (candidate routes) having an equal cost, and selects a candidate route that has the smallest sum of the power reduction index values as a route for a request flow.

(b) Case in which Link Traffic Volumes of Bi-Directional Links are on Different Traffic Levels The case in which the link traffic volume in the link L1 and the link traffic volume in the link L2 are on different traffic levels will be described next.

When the link traffic volumes of the bi-directional links are on different traffic levels, in order to reduce the power consumption at the physical link P, the traffic level of a link of the links L1 and L2 which has a higher power consumption operation level (traffic level) should be reduced.

In other words, the power consumption reduction index value S of a link that has a higher traffic level of the bi-directional links L1 and L2 in the physical link P is used as the power consumption reduction index value of the physical link P. Accordingly, the power consumption reduction index value S is calculated for the link that has a higher traffic level for the bi-directional links L1 and L2 in the physical link P. For calculating the power consumption reduction index value S, the above-described Equation (1) is used.

Figure 37A:
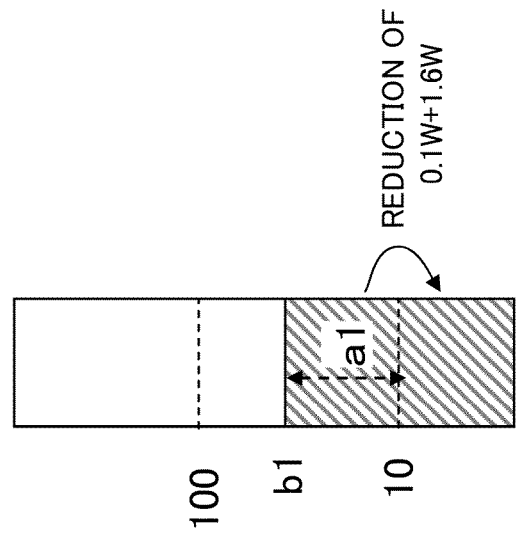
FIGS. 37A and 37B are diagrams illustrating a technique to calculate a power reduction index value in the sixth embodiment.
Figure 37B:
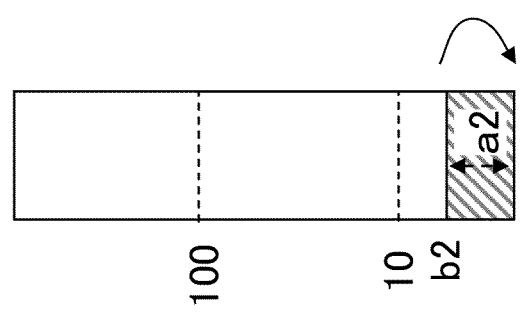

FIGS. 37A and 37B are diagrams illustrating a technique to calculate a power reduction index value for each link when the bi-directional links are on different traffic levels in the sixth embodiment.

For example, let's assume that the current traffic volume b1 of the link L1 is greater than 10 Mbps and equal to or smaller than 100 Mbps (100 Mbps≥b1>10 Mbps) while the current traffic volume b2 of the link L2 is smaller than 10 Mbps (b2<10 Mbps).

In such a case, the power consumption reduction index value S is calculated for the link L1 having a higher power consumption operation level (traffic level).

More specifically, since the current traffic volume b1 of the link L1 is greater than 10 Mbps and equal to or smaller than 100 Mbps (100 Mbps≥b1>10 Mbps), the rate threshold value that can reduce the power consumption corresponding to the current traffic volume by one level is 10 Mbps.

In other words, the difference between the current traffic volume and the rate threshold value that can reduce the power consumption by one level "a1" is (b1−10 Mbps).

For the endpoint node B of the link L1 (ALR characteristic 1), the difference (0.2 W−0.1 W=0.1 W) between the link power consumption (0.2 W) corresponding to the current traffic volume b1 of the link L1 and the link power consumption (0.1 W) when the traffic volume is reduced to be lower than the rate threshold value (10 Mbps), and the link power consumption is reduced by one level is the power consumption reduction Ed of the endpoint node B in the link L1.

Subsequently, for the origin node A of the link L1 (ALR characteristic 2), the difference (2.0 W−0.4 W=1.6 W) between the link power consumption (2.0 W) corresponding to the current traffic volume b1 of the link L1 and the link power consumption (0.4 W) when the traffic volume is reduced to be lower than the rate threshold value (10 Mbps), and the link power consumption is reduced by one level is the power consumption reduction Es of the origin node A in the link L1.

Accordingly, the power consumption reduction index value S of the link L1 can be obtained as follows from the above-described Equation (1):

Power consumption reduction index value $S$ of link $L1=(0.1\,W+1.6\,W)/a1=1.7\,W/a1$ In other words, Power consumption reduction index value $S$ of the physical link $P$ (the link $L1$ and the link $L2$)=1.7 $W/a1$.

As described above, the route calculation unit 31 calculates the power reduction index value for each link, calculates the respective sum of power reduction index values for each member link in each of multiple of routes (candidate routes) having an equal cost, and selects a candidate route that has the smallest sum of the power reduction index values as a route for a request flow.

As described above, in this sixth embodiment, in addition to the advantageous effects similar to those in the above-described fifth embodiment, determination of a request flow can be made which is more suited for the actual operation by taking the link traffic volumes of the bi-directional links in a physical link P into consideration.

Seventh Embodiment

In the fourth to sixth embodiments and the variant described above, power reduction index values are calculated based on the current link traffic volume and the link power consumption for each link included in the network, similarly to the first embodiment. However, this is not limiting.

This seventh embodiment also determines a candidate route that has the smallest sum of the power reduction index values as a route for a request flow from multiple candidate routes having an equal cost.

Subsequently, in this seventh embodiment, upon calculating power reduction index values, a power reduction index value is calculated based on the total traffic volume flowed into the endpoint node and the link power consumption, similarly to the second embodiment described above. In other words, an example of calculation of power reduction index values will be described, taking the DVS (Dynamic Voltage Scaling) feature of nodes into consideration.

Figure 38:
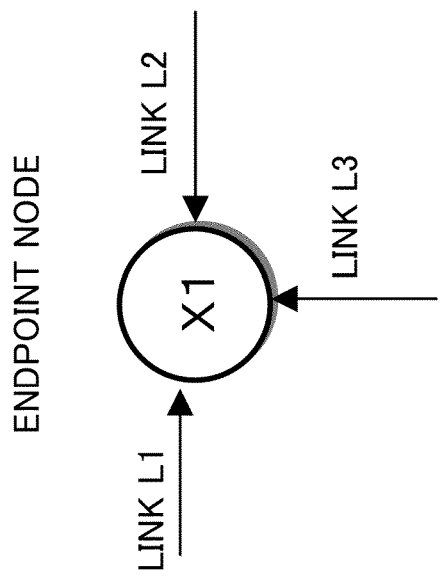
FIG. 38 is a diagram exemplifying the structure of a network.
Figure 39:
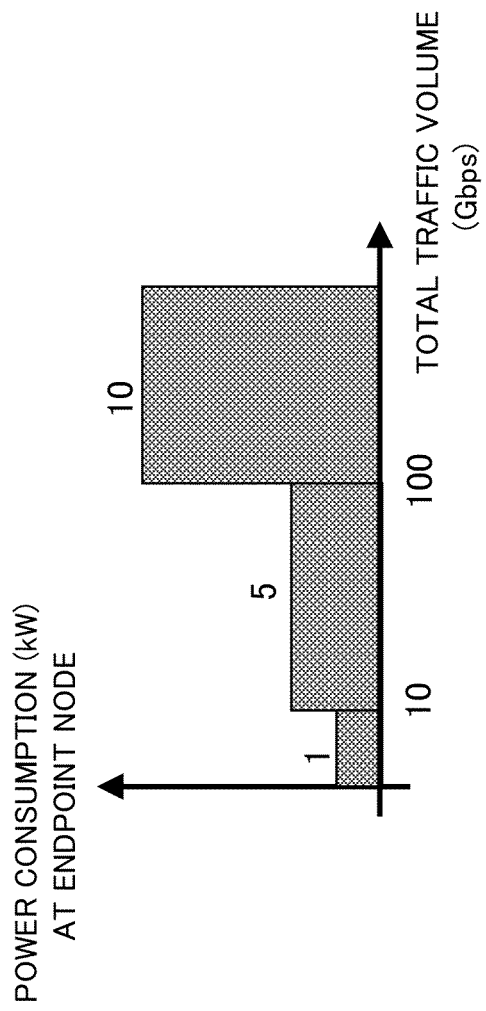
FIG. 39 is a diagram exemplifying a DVS characteristic.
Figure 40:
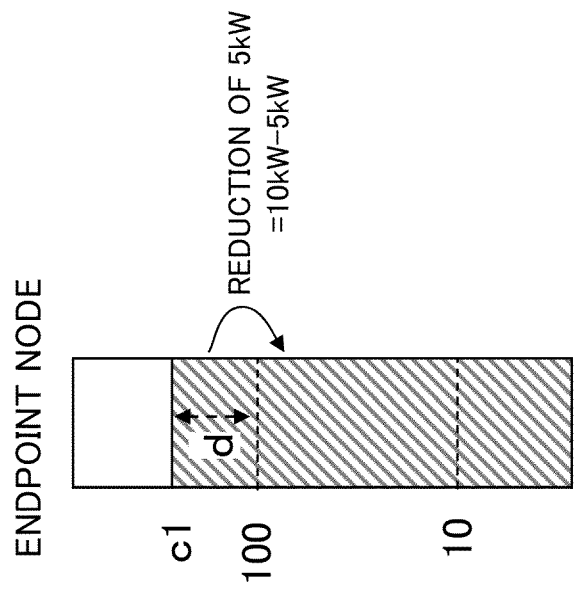
FIG. 40 is a diagram illustrating a seventh embodiment of a technique to calculate the power reduction index value.

FIG. 38 is a diagram exemplifying the structure of the network, FIG. 39 is a diagram illustrating the DVS feature; and FIG. 40 is a diagram illustrating a technique to calculate a power reduction index value in the seventh embodiment.

in the example depicted in FIG. 38, a node X1 is connected to a links L1, L2, and L3, and the node X1 is the endpoint node of the links L1, L2, and L3.

The relationship between the total traffic volume flowed into the endpoint node and the node power consumption has a characteristic as depicted in FIG. 39, for example. More specifically, the node power consumption is a discrete value, and is varied in stepwise with respect to the total traffic volume flowing into the node. That is, the node power consumption is 0 W for a total traffic volume of 0 Gbps; the node power consumption is 1 kW in a total traffic volume ranging from 0 Gbps and 10 Gbps; the node power consumption is 5 kW in a total traffic volume ranging from 10 Gbps and 100 Gbps; and the node power consumption is 10 kW at a total traffic volume exceeding 100 Gbps.

Also in the relationship between the total traffic volume flowed into the endpoint node and the node power consumption, the threshold traffic volume (total traffic volume) at which the node power consumption is varied in the ALR characteristics is referred to as the "rate threshold value". In the example depicted in FIG. 39, the total traffic volumes of 10 Mbps and 100 Gbps are rate threshold values.

The route calculation unit 31 calculates, for each of routes (candidate routes) having an equal cost, the respective power reduction index values of the nodes included in that route, and calculates the sum of the power reduction index values for each member link of each candidate route. The route calculation unit 31 then selects a candidate route that has the smallest sum of the power reduction index values as a route for a request flow.

In the example depicted in FIG. 38, the following holds true:

Power reduction index value of node $X1=$ power reduction index value of link $L1=$ power reduction index value of link $L2=$ power reduction index value of link $L3$ In addition, for calculating the power reduction index value, the following Equation (3) is used:

Power consumption reduction index value $S=$(power consumption reduction of the endpoint node $Ed$)/ difference "$d$" between the current total traffic volume flowing into the endpoint node and the rate threshold value that can reduce the power consumption by one level (3)

A technique for calculating the power reduction index value of the endpoint node X1 will be described with reference to FIGS. 39 and 40.

For example, in the endpoint node X1, if the current total traffic volume c1 is greater than 100 Gbps (c1>100 Gbps), the rate threshold value corresponding to the current total traffic volume that can reduce the power consumption by one level is 100 Gbps.

In other words, the difference "d" between the current traffic volume and the rate threshold value that can reduce the power consumption by one level is (c1−100 Gbps).

In addition, the difference (10 kW−5 kW=5 kW) between the node power consumption (10 kW) corresponding to the current total traffic volume c1 flowing into the node X1 and node power consumption (5 kW) when the traffic volume is reduced to be lower than the rate threshold value (100 Gbps) is the power consumption reduction at the node X1.

Accordingly, the power consumption reduction index value S of the node X1 can be obtained as follows from the above-described Equation (3):

Power consumption reduction index value $S$ of node $X3=(10\,kW-5\,kW)/d=5[kW]/d[Gbps]=0.005/d$ $[W/bps]$ The power consumption reduction index value S of the node X1=0.005/d [W/bps] can be interpreted that the power consumption reduction of 0.005 W can be possible for a traffic volume reduction of d1 bps in the node X1.

The route calculation unit 31 calculates, for each of routes (candidate routes) having an equal cost, the respective power reduction index values of the nodes included in that route, and calculates the sum of the power reduction index values for each member link of each candidate route. The route calculation unit 31 then selects a candidate route that has the smallest sum of the power reduction index values as a route for a request flow.

As described above, in this seventh embodiment, power reduction index values can also be calculated based on the total traffic volume flowed into the endpoint node and the link power consumption, and a route for a request flow can be selected from multiple candidate routes having an equal link.

Eighth Embodiment

This eighth embodiment also determines a candidate route that has the smallest sum of the power reduction index values as a route for a request flow from multiple candidate routes having an equal cost.

In this eighth embodiment, power reduction index values are calculated using the link power consumption that is varied in stepwise with respect to the link traffic volume and the node power consumption that is varied in stepwise in accordance with the total traffic volume, similarly to the third embodiment described above.

For example, as depicted in FIG. 15, nodes A1 and X1 are coupled with each other through links L1 and L2 indicated by the arrows; nodes X1 and B1 are coupled with each other through links L3 and L4; and the node X1 is further coupled to other nodes through links Li and Lj, wherein terminals provided at the respective points are connected to the nodes A1 and B1.

Let's assume that there are multiple candidate routes having an equal cost when a request flow is newly add to such a network.

The route calculation unit 31 calculates, for each of routes (candidate routes) having an equal cost, the respective power reduction index values S for the links forming that candidate route, using the technique disclosed in any of the fifth or sixth embodiment. The route calculation unit 31 then calculates the power reduction index value S1, which is the sum of the power reduction index values S of each link calculated for each candidate route.

The route calculation unit 31 then calculates, for each of the candidate routes having the equal cost, the power reduction index value S2, based on the flowed-in total traffic volume and the node power consumption for the endpoint node included in the candidate route, using the technique disclosed in the seventh embodiment described above.

The route calculation unit 31 then calculates, for each of the candidate routes having the equal cost, the power reduction index value S1 related to each link in each candidate route and power reduction index value S2 related to each node. The route calculation unit 31 then selects a candidate route that has the smallest sum of the calculated power reduction index values as a route for a request flow.

As described above, in the eighth embodiment, upon selecting a route for a request flow multiple candidate routes having an equal link, the optimal route can be determine by taking both of the link power consumption corresponding to the link traffic volume and the node power consumption corresponding to the total traffic volume flowed into the node into consideration.

Ninth Embodiment

Although the fifth to eighth embodiments exemplify techniques for selecting an appropriate route from route candidates having the equal cost by calculating power reduction index values, this is not limiting.

In this ninth embodiment, an appropriate route is selected from route candidates having the equal cost by managing the traffic variation trend for each link included in each route candidate having the equal cost and calculating the power reduction rate R (W/hours) taking that trend into consideration.

Figure 41:
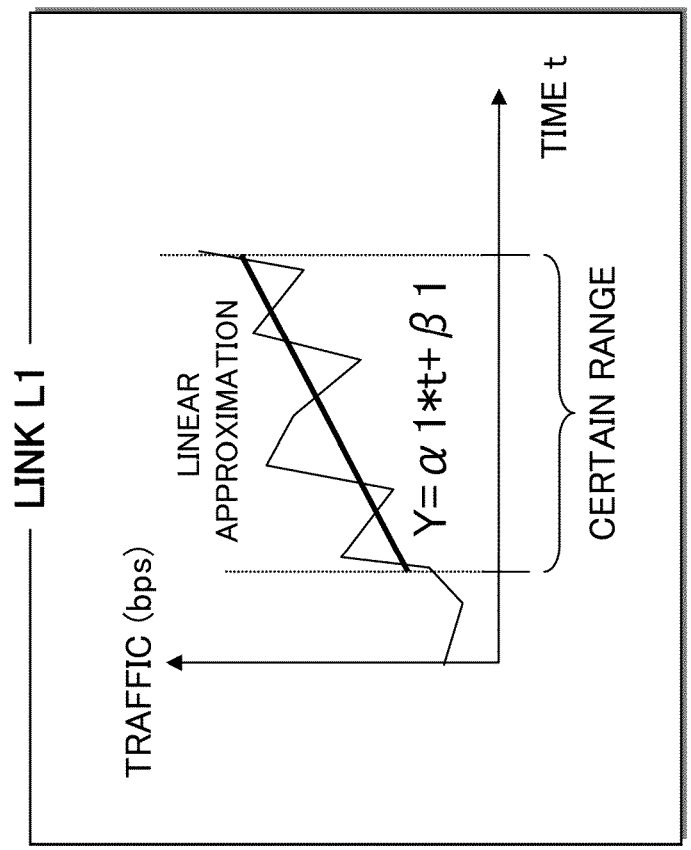
FIG. 41 is a diagram illustrating a technique to derive a power reduction rate for each link.
Figure 42:
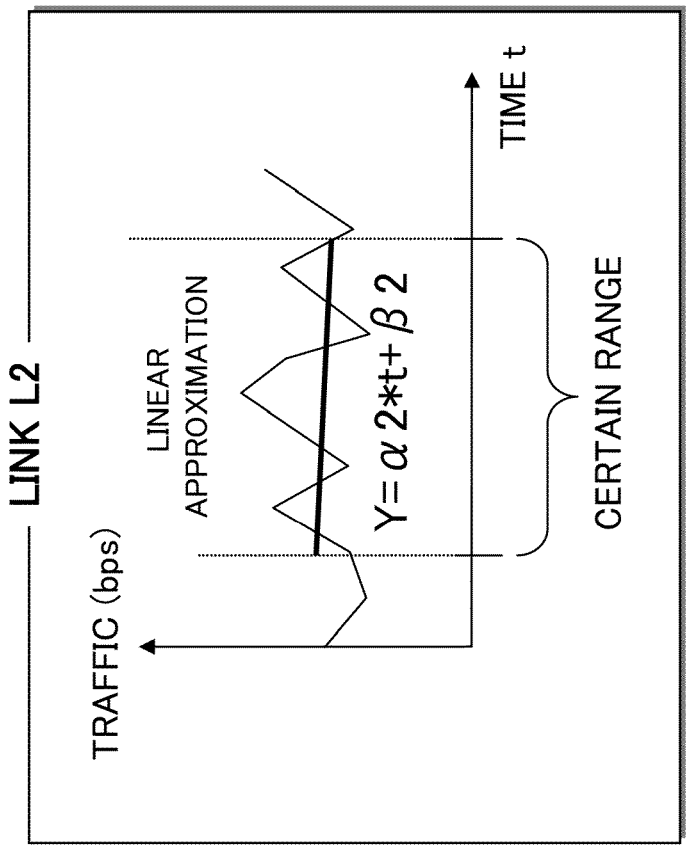
FIG. 42 is a diagram illustrating a technique to derive a power reduction rate for each link.

FIGS. 41 and 42 are diagrams illustrating a technique to derive a power reduction index value for each link in the ninth embodiment.

FIG. 41 is a diagram illustrating a technique to derive a power reduction index value of a link L1; and FIG. 42 is a diagram illustrating a technique to derive a power reduction index value of a link L2.

The route calculation unit 31 obtain multiple link traffic volumes in a predetermined period (certain range) for a link. Note that these link traffic volumes are preferably obtained by measuring link traffic volumes in an actual link, for example.

The route calculation unit 31 then determines a variation trend of the traffic volumes in the predetermined range based on the obtained traffic volume. In the example depicted in FIGS. 41 and 42, the variation trend of the link traffic volume is determined by linearly approximating the obtained multiple traffic volumes in the certain range. Various known techniques can be used as the technique for linearly approximating the measurements of multiple traffic volumes, and the least-squares method may be used, for example.

In the example depicted in FIG. 41, link traffic volumes in the link L1 in a certain range are expressed by the following Equation (4):

$$Y1 = \alpha 1 \times t + \beta 1 \quad (4)$$

Similarly, in the example depicted in FIG. 42, link traffic volumes in the link L2 in a certain range are expressed by the following Equation (5):

$$Y2 = \alpha 2 \times t + \beta 2 \quad (5)$$

The power reduction rate R1 (W/hours) of link L1 can be expressed by the following Equation (6):

$$\text{Power reduction rate } R1 \text{ of the link } L1 = P \times \alpha 1 \quad (6)$$

Similarly, the power reduction rate R2 (W/hours) of link L2 can be expressed by the following Equation (7):

$$\text{Power reduction rate } R2 \text{ of the link } L2 = P \times \alpha 2 \quad (7)$$

The route calculation unit 31 calculates, for each of routes (candidate routes) having an equal cost, the respective power reduction rate values of the links included in that route, and calculates the sum of the power reduction rate values for each member link of each candidate route. The route calculation unit 31 then selects a candidate route that has the smallest sum of the power reduction rate values as a route for a request flow.

Figure 43:
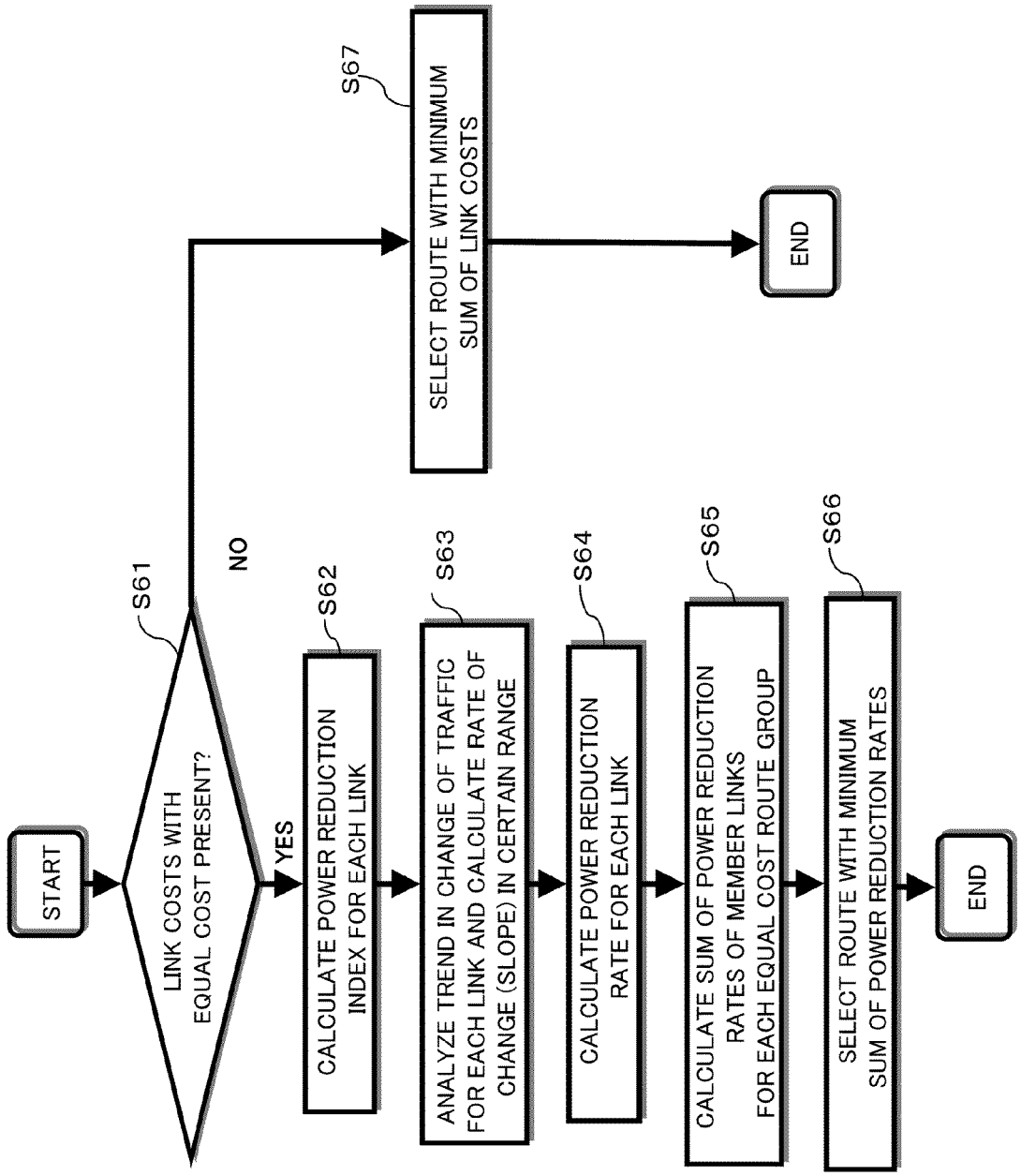
FIG. 43 is a flowchart of a ninth embodiment of network route calculation processing executed by a route calculation unit in the network management system.

FIG. 43 is a flowchart of a ninth embodiment of network route calculation processing executed by the route calculation unit 31 in the network management system 30.

The route calculation unit 31 gives a link cost to each link connecting nodes, for all of the routes from the start node (source node) to the end node (destination node) specified in a flow setting request, using the technique in any of the embodiments and the variant described above. The route calculation unit 31 then identifies the route that has the smallest sum of link cost values from all of the routes from the start node (source node) to the end node (destination node).

The route calculation unit 31 checks whether there are multiple routes having an equal cost (Step S61). if there are not multiple routes having an equal cost (see NO route in Step S61), the route that has the smallest sum of link cost values is determined as a route for the request flow determine (Step S67) and the processing is terminated.

In contrast, if there are multiple routes having an equal cost (see YES route in Step S61), the route calculation unit 31 calculates, for each of the routes (candidate routes) having the equal cost, the respective power reduction index values of the links constructing that route (Step S62). In addition, the route calculation unit 31 analyzes the traffic variation trend of each link, and calculates the change rate (slope) in the certain range (Step S63).

In addition, the route calculation unit 31 calculates, for each of routes (candidate routes) having an equal cost, the respective power reduction rate values of the links included in that route (Step S64).

Thereafter, the route calculation unit 31 then calculates, for each of the candidate routes, the sum of the power reduction rates of each member link for each candidate route (Step S65) and selects the candidate route that has the smallest sum of the power reduction rate values as a route for the request flow (Step S66), after which the processing is terminated.

As described above, in accordance with the ninth embodiment, an appropriate route can be selected by taking the traffic variation trend into consideration if there are multiple route candidates having the equal cost.

Others

Note that, with regard to the embodiments and variants described above, various modifications may be made without departing from the spirit of the present embodiments.

For example, any of the disclosure of the fifth to ninth embodiments may be appropriately practiced in combination with the first to fourth embodiments and the variants.

The CPU (central processing unit) in an information processing apparatus may function as the route calculation unit 31, the link cost management unit 32, the flow request accepting unit 33, the device power control unit 34, the state management unit 35, and the route setting unit 36, which are described above, by execute a route calculation program.

Note that the program (route calculation program) for implementing the functions as the route calculation unit 31, the link cost management unit 32, the flow request accepting unit 33, the device power control unit 34, the state management unit 35, the route setting unit 36 are provided in the form of programs recorded on a computer readable recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW, HD-DVD), a Blu Ray disk, a magnetic disk, an optical disk, a magneto-optical disk, or the like. The computer then reads a program from that storage medium and uses that program after transferring it to the internal storage apparatus or external storage apparatus or the like. Alternatively, the program may be recoded on a storage device (storage medium), for example, a magnetic disk, an optical disk, a magneto-optical disk, or the like, and the program may be provided from to the storage device to the computer through a communication path.

Upon realizing the functions as the route calculation unit 31, the link cost management unit 32, the flow request accepting unit 33, the device power control unit 34, the state management unit 35, and the route setting unit 36, programs stored in internal storage devices (the RAM 42 and the ROM 43 in the network management system 30) are executed by a microprocessor in a computer (the CPU 41). In this case, the computer may alternatively read a program stored in the storage medium for executing it.

Note that, in this embodiments and the variant, the term "computer" may be a concept including hardware and an operating system, and may refer to hardware that operates under the control of the operating system. Alternatively, when an application program alone can make the hardware to be operated without requiring an operating system, the hardware itself may represent a computer. The hardware includes at least a microprocessor, e.g., CPU, and a means for reading a computer program recorded on a storage medium and, in this embodiment, the network management system 30 includes a function as a computer.

According to the embodiments, it is possible to reduce the power consumption in the entire network for a request flow.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A route calculation system that calculates a route for passing a request flow in response to a request for flow setting between any of the nodes in a network comprising a plurality of nodes connected with each other through links, each link having a characteristic in which a link power consumption varied in accordance with a link traffic volume, the route calculation system comprising:
   a collection unit that collects a current link traffic volume and a link power consumption for each link included in the network;
   a link cost calculation unit that estimates, for each link, an increase in the link power consumption due to the request flow based on the current link traffic volume, the link power consumption, the request flow, and the characteristic, and calculates a link cost value based on the increase in the link power consumption; and
   a route determination unit that determines, as a route for the request flow, a route that has the smallest sum of the link cost values of each route connecting between the any nodes, wherein
   the link power consumption is estimated for a link having a greater link traffic volume of bi-directional links.

2. A route calculation system that calculates a route for passing a request flow in response to a request for flow setting between any of the nodes in a network comprising a plurality of nodes connected with each other through links, each node having a characteristic in which a total power consumption that is flowing in to that node varied in accordance with a link traffic volume, the route calculation system comprising:
   a collection unit that collects a total traffic volume of a current endpoint node and a power consumption for each link included in the network;
   a link cost calculation unit that estimates, for each link, an increase in the power consumption due to the request flow based on the total traffic volume of the current endpoint node, the power consumption, the request flow, and the characteristic, and calculates a link cost value based on the increase in the power consumption;
   a route determination unit that determines, as a route for the request flow, a route that has the smallest sum of the link cost values of each route connecting between the any nodes, and
   a power reduction index value calculation unit that calculates, if there are a plurality of candidate routes that provide the minimum sum of the link cost values, a power reduction index value representing how possible power consumption reduction when a traffic is reduced for each of the candidate routes, wherein the route determination unit determines a candidate route that has the smallest minimum power reduction index value as a route for the request flow, the power reduction index value calculation unit calculates the power reduction index value for each link forming the candidate route, the route determination unit determines a candidate route that has the smallest sum of the power reduction index values of the links included in that candidate route from the candidate routes, as a route for the request flow, each link has a characteristic in which its link power consumption is varied in accordance with its link traffic volume, and the link power consumption is varied in stepwise with the link traffic volume as a predetermined threshold value, and if respective link traffic volumes of bi-directional links related to a physical link are on the same traffic level having the same the link power consumption, the power reduction index value calculation unit calculates, for each link in the bi-directional links, the power reduction index value by dividing a difference between a link power consumption corresponding to a current link traffic volume and a link power consumption that is one level lower than that link power consumption, with a sum of differences, of each link in the bi-directional, between a current link traffic volume and a link traffic volume as the threshold value for reducing the link power consumption by one level.

3. A route calculation system that calculates a route for passing a request flow in response to a request for flow setting between any of the nodes in a network comprising a plurality of nodes connected with each other through links, each link having a characteristic in which a link power consumption varied in accordance with a link traffic volume, the route calculation system comprising:

a collection unit that collects a current link traffic volume and a link power consumption for each link included in the network;

a link cost calculation unit that estimates, for each link, an increase in the link power consumption due to the request flow based on the current link traffic volume, the link power consumption, the request flow, and the characteristic, and calculates a link cost value based on the increase in the link power consumption;

a route determination unit that determines, as a route for the request flow, a route that has the smallest sum of the link cost values of each route connecting between the any nodes; and a power reduction index value calculation unit that calculates, if there are a plurality of candidate routes that provide the minimum sum of the link cost values, a power reduction index value representing how possible power consumption reduction when a traffic is reduced for each of the candidate routes, wherein the route determination unit determines a candidate route that has the smallest minimum power reduction index value as a route for the request flow, the power reduction index value calculation unit calculates the power reduction index value for each link forming the candidate route, the route determination unit determines a candidate route that has the smallest sum of the power reduction index values of the links included in that candidate route from the candidate routes, as a route for the request flow, each link has a characteristic in which its link power consumption is varied in accordance with its link traffic volume, and the link power consumption is varied in stepwise with the link traffic volume as a predetermined threshold value, and if respective link traffic volumes of bi-directional links related to a physical link are on the same traffic level having the same the link power consumption, the power reduction index value calculation unit calculates, for each link in the bi-directional links, the power reduction index value by dividing a difference between a link power consumption corresponding to a current link traffic volume and a link power consumption that is one level lower than that link power consumption, with a sum of differences, of each link in the bi-directional, between a current link traffic volume and a link traffic volume as the threshold value for reducing the link power consumption by one level.

4. A route calculation system that calculates a route for passing a request flow in response to a request for flow setting between any of the nodes in a network comprising a plurality of nodes connected with each other through links, each link having a characteristic in which a link power consumption varied in accordance with a link traffic volume, the route calculation system comprising:

a collection unit that collects a current link traffic volume and a link power consumption for each link included in the network;

a link cost calculation unit that estimates, for each link, an increase in the link power consumption due to the request flow based on the current link traffic volume, the link power consumption, the request flow, and the characteristic, and calculates a link cost value based on the increase in the link power consumption;

a route determination unit that determines, as a route for the request flow, a route that has the smallest sum of the link cost values of each route connecting between the any nodes; and a power reduction index value calculation unit that calculates, if there are a plurality of candidate routes that provide the minimum sum of the link cost values, a power reduction index value representing how possible power consumption reduction when a traffic is reduced for each of the candidate routes, and wherein the route determination unit determines a candidate route that has the smallest minimum power reduction index value as a route for the request flow, the power reduction index value calculation unit calculates the power reduction index value for each link forming the candidate route, the route determination unit determines a candidate route that has the smallest sum of the power reduction index values of the links included in that candidate route from the candidate routes, as a route for the request flow, each link has a characteristic in which its link power consumption is varied in accordance with its link traffic volume, and the link power consumption is varied in stepwise with the link traffic volume as a predetermined threshold value, and if respective link traffic volumes of bi-directional links related to a physical link are on different traffic levels having different power consumptions, the power reduction index value calculation unit calculates, for a link of the bi-directional links which has a higher power consumption, the power reduction index value by dividing a difference between a link power consumption corresponding to a current link traffic volume and the next-lower-level link power consumption, with a difference, of that link, between a current link traffic volume and a link traffic volume as the threshold value for reducing the link power consumption by one level.

5. A route calculation system that calculates a route for passing a request flow in response to a request for flow setting between any of the nodes in a network comprising a plurality of nodes connected with each other through links, each link having a characteristic in which a link power consumption varied in accordance with a link traffic volume, the route calculation system comprising:
 a collection unit that collects a current link traffic volume and a link power consumption for each link included in the network;
 a link cost calculation unit that estimates, for each link, an increase in the link power consumption due to the request flow based on the current link traffic volume, the link power consumption, the request flow, and the characteristic, and calculates a link cost value based on the increase in the link power consumption;
 a route determination unit that determines, as a route for the request flow, a route that has the smallest sum of the link cost values of each route connecting between the any nodes; and
 a power reduction index value calculation unit that calculates, if there are a plurality of candidate routes that provide the minimum sum of the link cost values, a power reduction index value representing how possible power consumption reduction when a traffic is reduced for each of the candidate routes, and
 wherein the route determination unit determines a candidate route that has the smallest minimum power reduction index value as a route for the request flow,
 each node has a characteristic in which the power consumption is varied in accordance with the total traffic volume that is flowed in to that node, and the power consumption is varied in stepwise with the traffic volume as a predetermined threshold value, and
 the power reduction index value calculation unit calculates, for the node included in the candidate route, by dividing a difference between a power consumption corresponding to a current traffic volume and the next-lower-level power consumption, with a different, of that node, between a current traffic volume and a traffic volume as the threshold value for reducing the power consumption by one level.

6. The route calculation system according to claim 1, further comprising:
 a power reduction rate calculation unit that calculates, if there are a plurality of candidate routes that provide the minimum sum of the link cost values, for respective links forming each candidate route, a power reduction rate based on a traffic change trend, wherein the route determination unit determines a candidate route that has the smallest sum of the power reduction rates of the links included in that candidate route from the candidate routes, as a route for the request flow.

7. A route calculation system that calculates a route for passing a request flow in response to a request for flow setting between any of the nodes in a network comprising a plurality of nodes connected with each other through links, the route calculation system comprising:
 a power reduction index value calculation unit that calculates, for each of a plurality of candidate routes connecting between any of the nodes, a power reduction index value representing a possible power consumption reduction by a traffic reduction; and
 a route determination unit that determines a candidate route having the smallest power reduction index value as a route for the request flow, wherein
 the power reduction index value calculation unit calculates the power reduction index value for each link forming the candidate route,
 the route determination unit determines a candidate route that has the smallest sum of the power reduction index values of the links included in that candidate route from the candidate routes, as a route for the request flow,
 each link has a characteristic in which its link power consumption is varied in accordance with its link traffic volume, and the link power consumption is varied in stepwise with the link traffic volume as a predetermined threshold value, and
 if respective link traffic volumes of bi-directional links related to a physical link are on the same traffic level having the same the link power consumption, the power reduction index value calculation unit calculates, for each link in the bi-directional links, the power reduction index value by dividing a difference between a link power consumption corresponding to a current link traffic volume and a link power consumption that is one level lower than that link power consumption, with a sum of differences, of each link in the bi-directional, between a current link traffic volume and a link traffic volume as the threshold value for reducing the link power consumption by one level.

8. A route calculation system that calculates a route for passing a request flow in response to a request for flow setting between any of the nodes in a network comprising a plurality of nodes connected with each other through links, the route calculation system comprising:
 a power reduction index value calculation unit that calculates, for each of a plurality of candidate routes connecting between any of the nodes, a power reduction index value representing a possible power consumption reduction by a traffic reduction; and
 a route determination unit that determines a candidate route having the smallest power reduction index value as a route for the request flow, wherein
 the power reduction index value calculation unit calculates the power reduction index value for each link forming the candidate route,
 the route determination unit determines a candidate route that has the smallest sum of the power reduction index values of the links included in that candidate route from the candidate routes, as a route for the request flow,
 each link has a characteristic in which its link power consumption is varied in accordance with its link traffic volume, and the link power consumption is varied in stepwise with the link traffic volume as a predetermined threshold value, and
 if respective link traffic volumes of bi-directional links related to a physical link are on different traffic levels having different power consumptions, the power reduction index value calculation unit calculates, for a link of the bi-directional links which has a higher power consumption, the power reduction index value by dividing a difference between a link power consumption corresponding to a current link traffic volume and the next-lower-level link power consumption, with a difference, of that link, between a current link traffic volume and a link traffic volume as the threshold value for reducing the link power consumption by one level.

9. A route calculation system that calculates a route for passing a request flow in response to a request for flow setting between any of the nodes in a network comprising a plurality of nodes connected with each other through links, the route calculation system comprising:
- a power reduction index value calculation unit that calculates, for each of a plurality of candidate routes connecting between any of the nodes, a power reduction index value representing a possible power consumption reduction by a traffic reduction; and
- a route determination unit that determines a candidate route having the smallest power reduction index value as a route for the request flow, wherein
- each node has a characteristic in which the power consumption is varied in accordance with the total traffic volume that is flowed in to that node, and the power consumption is varied in stepwise with the traffic volume as a predetermined threshold value, and
- the power reduction index value calculation unit calculates, for the node included in the candidate route, by dividing a difference between a power consumption corresponding to a current traffic volume and the next-lower-level power consumption, with a different, of that node, between a current traffic volume and a traffic volume as the threshold value for reducing the power consumption by one level.

10. The route calculation system according to claim 7, further comprising a power reduction rate calculation unit that calculates, for respective links forming each candidate route, a power reduction rate based on a traffic change trend, and
- the route determination unit determines a candidate route that has the smallest sum of the power reduction rates of the links included in that candidate route from the candidate routes, as a route for the request flow.

11. A route calculation system that calculates a route for passing a request flow in response to a request for flow setting between any of the nodes in a network comprising a plurality of nodes connected with each other through links, each node having a characteristic in which a total power consumption that is flowing in to that node varied in accordance with a link traffic volume, the route calculation system comprising:
- a collection unit that collects a total traffic volume of a current endpoint node and a power consumption for each link included in the network;
- a link cost calculation unit that estimates, for each link, an increase in the power consumption due to the request flow based on the total traffic volume of the current endpoint node, the power consumption, the request flow, and the characteristic, and calculates a link cost value based on the increase in the power consumption;
- a route determination unit that determines, as a route for the request flow, a route that has the smallest sum of the link cost values of each route connecting between the any nodes, and
- a power reduction index value calculation unit that calculates, if there are a plurality of candidate routes that provide the minimum sum of the link cost values, a power reduction index value representing how possible power consumption reduction when a traffic is reduced for each of the candidate routes,
- wherein the route determination unit determines a candidate route that has the smallest minimum power reduction index value as a route for the request flow,
- the power reduction index value calculation unit calculates the power reduction index value for each link forming the candidate route,
- the route determination unit determines a candidate route that has the smallest sum of the power reduction index values of the links included in that candidate route from the candidate routes, as a route for the request flow,
- each link has a characteristic in which its link power consumption is varied in accordance with its link traffic volume, and the link power consumption is varied in stepwise with the link traffic volume as a predetermined threshold value, and
- if respective link traffic volumes of bi-directional links related to a physical link are on different traffic levels having different power consumptions, the power reduction index value calculation unit calculates, for a link of the bi-directional links which has a higher power consumption, the power reduction index value by dividing a difference between a link power consumption corresponding to a current link traffic volume and the next-lower-level link power consumption, with a difference, of that link, between a current link traffic volume and a link traffic volume as the threshold value for reducing the link power consumption by one level.

12. A route calculation system that calculates a route for passing a request flow in response to a request for flow setting between any of the nodes in a network comprising a plurality of nodes connected with each other through links, each node having a characteristic in which a total power consumption that is flowing in to that node varied in accordance with a link traffic volume, the route calculation system comprising:
- a collection unit that collects a total traffic volume of a current endpoint node and a power consumption for each link included in the network;
- a link cost calculation unit that estimates, for each link, an increase in the power consumption due to the request flow based on the total traffic volume of the current endpoint node, the power consumption, the request flow, and the characteristic, and calculates a link cost value based on the increase in the power consumption;
- a route determination unit that determines, as a route for the request flow, a route that has the smallest sum of the link cost values of each route connecting between the any nodes, and
- a power reduction index value calculation unit that calculates, if there are a plurality of candidate routes that provide the minimum sum of the link cost values, a power reduction index value representing how possible power consumption reduction when a traffic is reduced for each of the candidate routes, wherein
- the route determination unit determines a candidate route that has the smallest minimum power reduction index value as a route for the request flow,
- each node has a characteristic in which the power consumption is varied in accordance with the total traffic volume that is flowed in to that node, and the power consumption is varied in stepwise with the traffic volume as a predetermined threshold value, and
- the power reduction index value calculation unit calculates, for the node included in the candidate route, by dividing a difference between a power consumption corresponding to a current traffic volume and the next-lower-level power consumption, with a different, of that node, between a current traffic volume and a traffic volume as the threshold value for reducing the power consumption by one level.

* * * * *